(12) United States Patent
Miura

(10) Patent No.: US 11,231,890 B2
(45) Date of Patent: Jan. 25, 2022

(54) PRESET INFORMATION DISPLAYING METHOD AND INFORMATION PROCESSING APPARATUS

(71) Applicant: Oki Data Corporation, Tokyo (JP)

(72) Inventor: Ken Miura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/926,233

(22) Filed: Jul. 10, 2020

(65) Prior Publication Data
US 2021/0019100 A1    Jan. 21, 2021

(30) Foreign Application Priority Data
Jul. 16, 2019    (JP) .............................. JP2019-131075

(51) Int. Cl.
*G06F 3/12* (2006.01)
*B41J 3/407* (2006.01)

(52) U.S. Cl.
CPC .......... *G06F 3/1257* (2013.01); *B41J 3/4075* (2013.01); *G06F 3/1204* (2013.01)

(58) Field of Classification Search
CPC ............................. G06F 3/1257; G06F 3/1204
USPC ........................................................ 358/1.15
See application file for complete search history.

(56) References Cited

U.S. PATENT DOCUMENTS

| 2014/0153014 A1* | 6/2014 | Kaneda .............. H04N 1/00663 358/1.12 |
| 2019/0243591 A1* | 8/2019 | Nishii ....................... H04N 1/21 |
| 2020/0319772 A1* | 10/2020 | Asai ....................... G06F 3/1208 |

FOREIGN PATENT DOCUMENTS

JP          2003-241947 A       8/2003

* cited by examiner

*Primary Examiner* — Thomas J Lett
(74) *Attorney, Agent, or Firm* — Rabin & Berdo, P.C.

(57) ABSTRACT

A preset information displaying method includes: performing a first registration process that is a process of registering, in a database, first preset information and first image information in a state of being associated with each other, the first preset information being used upon performing a first printing process, the first image information representing a result of the first printing process; and performing a display process that is a process of displaying, on a selection screen, the first preset information and the first image information in correspondence with each other, the first image information being associated with the first preset information in the database, the selection screen including a list of one or a plurality of pieces of preset information including the first preset information, the selection screen receiving selection operation, the selection operation being operation of selecting any of the one or the plurality of pieces of preset information.

8 Claims, 21 Drawing Sheets

| HISTORY IDENTIFIER | PRINT INSTRUCTING TERMINAL | PRINT PERFORMING PRINTER | DATE AND TIME OF PRINTING | FAVORITE'S NAME | IMAGE IDENTIFIER | |
|---|---|---|---|---|---|---|
| H045 | PC002 | PRINTER A | 2018/12/14 10:12 | Event Coupon 2018 | UNREGISTERED | H1 |
| H044 | PC001 | PRINTER A | 2018/12/13 11:42 | Label 004 (Round) | IMG053 | H2 |
| H043 | PC003 | PRINTER B | 2018/12/07 16:21 | Ticket 02 | IMG052 | H3 |
| H042 | PC003 | PRINTER C | 2018/12/07 10:16 | Label 004 (Round) | IMG050 | H4 |
| H041 | PC001 | PRINTER B | 2018/12/05 10:50 | Label 002 (Star) | IMG051 | H5 |

| FAVORITE'S NAME | SETTING INFORMATION |
|---|---|
| Event Coupon 2017 | Sheet size = 120 × 60 mm, Sheet type = Plane paper, Color printing, Resolution = 1200 dpi ... |
| Event Coupon 2018 | Sheet size = 125 × 55 mm, Sheet type = Plane paper, Color printing, Resolution = 120 dpi ... |
| Ticket 01 | Sheet size = 95 × 50 mm, Sheet type = Plane paper, Color printing, Resolution = 1200 dpi ... |
| Ticket 02 | Sheet size = 120 × 60 mm, Sheet type = Plane paper, Monochrome printing, Resolution = 600 dpi ... |
| Ticket 03 | Sheet size = 100 × 30 mm, Sheet type = High-quality paper, Color printing, Resolution = 1200 dpi ... |
| Ticket 04 | Sheet size = 30 × 100 mm, Sheet type = Plane paper, Color printing, Resolution = 1200 dpi ... |
| Label 001 | Sheet size = 50 × 50 mm, Sheet type = Whole-surface label sheet, Color printing, Resolution = 1200 dpi ... |
| Label 002 (Star) | Sheet size = 45 × 45 mm, Sheet type = Die-cut label sheet, Color printing, Resolution = 1200 dpi ... |
| Label 003 | Sheet size = 85 × 40 mm, Sheet type = Whole-surface label sheet, Color printing, Resolution = 1200 dpi ... |
| Label 004 (Round) | Sheet size = 55 × 60 mm, Sheet type = Die-cut label sheet, Color printing, Resolution = 1200 dpi ... |
| Label 005 | Sheet size = 40 × 200 mm, Sheet type = Die-cut label sheet, Color printing, Resolution = 1200 dpi ... |
| Label 006 | Sheet size = 120 × 80 mm, Sheet type = Whole-surface label sheet, Color printing, Resolution = 1200 dpi ... |
| ⋮ | ⋮ |

FIG. 2

| HISTORY IDENTIFIER | PRINT INSTRUCTING TERMINAL | PRINT PERFORMING PRINTER | DATE AND TIME OF PRINTING | FAVORITE'S NAME | IMAGE IDENTIFIER |
|---|---|---|---|---|---|
| H045 | PC002 | PRINTER A | 2018/12/14 10:12 | Event Coupon 2018 | UNREGISTERED |
| H044 | PC001 | PRINTER A | 2018/12/13 11:42 | Label 004 (Round) | IMG053 |
| H043 | PC003 | PRINTER B | 2018/12/07 16:21 | Ticket 02 | IMG052 |
| H042 | PC003 | PRINTER C | 2018/12/07 10:16 | Label 004 (Round) | IMG050 |
| H041 | PC001 | PRINTER B | 2018/12/05 10:50 | Label 002 (Star) | IMG051 |
| ... | ... | ... | ... | ... | ... |

FIG. 3

| IMAGE IDENTI- FIER | DATE AND TIME OF REGISTRATION | IMAGE DATA | HISTORY IDENTI- FIER | |
|---|---|---|---|---|
| IMG053 | 2018/12/13 13:10 | | H044 | I1 |
| IMG052 | 2018/12/07 11:32 | | H043 | I2 |
| IMG051 | 2018/12/07 10:21 | | H041 | I3 |
| IMG050 | 2018/12/07 15:41 | | H042 | I4 |
| IMG049 | 2018/12/03 09:16 | | H040 | I5 |
| ⋮ | ⋮ | ⋮ | ⋮ | |

FIG. 4

PRESET INFORMATION DISPLAYING METHOD AND INFORMATION PROCESSING APPARATUS

CROSS REFERENCE TO RELATED APPLICATIONS

The present application claims priority from Japanese Patent Application No. 2019-131075 filed on Jul. 16, 2019, the entire contents of which are hereby incorporated by reference.

BACKGROUND

The technology relates to: a preset information displaying method for a printer driver; and an information processing apparatus that uses the preset information displaying method.

A printer driver sometimes generates print data on the basis of selection operation for preset information that includes setting values of various print setting items, for example, as disclosed in Japanese Unexamined Patent Application Publication No. 2003-241947.

SUMMARY

In general, high user friendliness is desired in print setting of a printer driver. It is therefore expected to further improve the user friendliness of the print setting of the print driver.

It is desirable to provide a preset information displaying method and an information processing apparatus that allows for improvement in user friendliness.

According to one embodiment of the technology, there is provided a preset information displaying method that includes: performing a first registration process, the first registration process being a process of registering, in a database, first preset information and first image information in a state of being associated with each other, the first preset information being used upon performing a first printing process, the first image information representing a result of the first printing process; and performing a display process, the display process being a process of displaying, on a selection screen, the first preset information and the first image information in correspondence with each other, the first image information being associated with the first preset information in the database, the selection screen including a list of one or a plurality of pieces of preset information including the first preset information, the selection screen receiving selection operation, the selection operation being operation of selecting any of the one or the plurality of pieces of preset information.

According to one embodiment of the technology, there is provided an information processing apparatus that includes a display processor. The display processor causes first preset information and first image information to be displayed on a selection screen in correspondence with each other. The first preset information is used upon performing a first printing process. The first image information represents a result of the first printing process. The selection screen includes a list of one or a plurality of pieces of preset information including the first preset information. The selection screen receives selection operation. The selection operation is operation of selecting any of the one or the plurality of pieces of preset information. The first preset information is registered, in a database, in a state of being associated with the first image information. The display processor causes the first preset information and the first image information to be displayed in correspondence with each other. The first image information is associated with the first preset information in the database.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2 is an explanatory diagram illustrating an example of favorite data illustrated in FIG. 1.

FIG. 3 is an explanatory diagram illustrating an example of history data illustrated in FIG. 1.

FIG. 4 is an explanatory diagram illustrating an example of image information data illustrated in FIG. 1.

DETAILED DESCRIPTION

Figure 1:
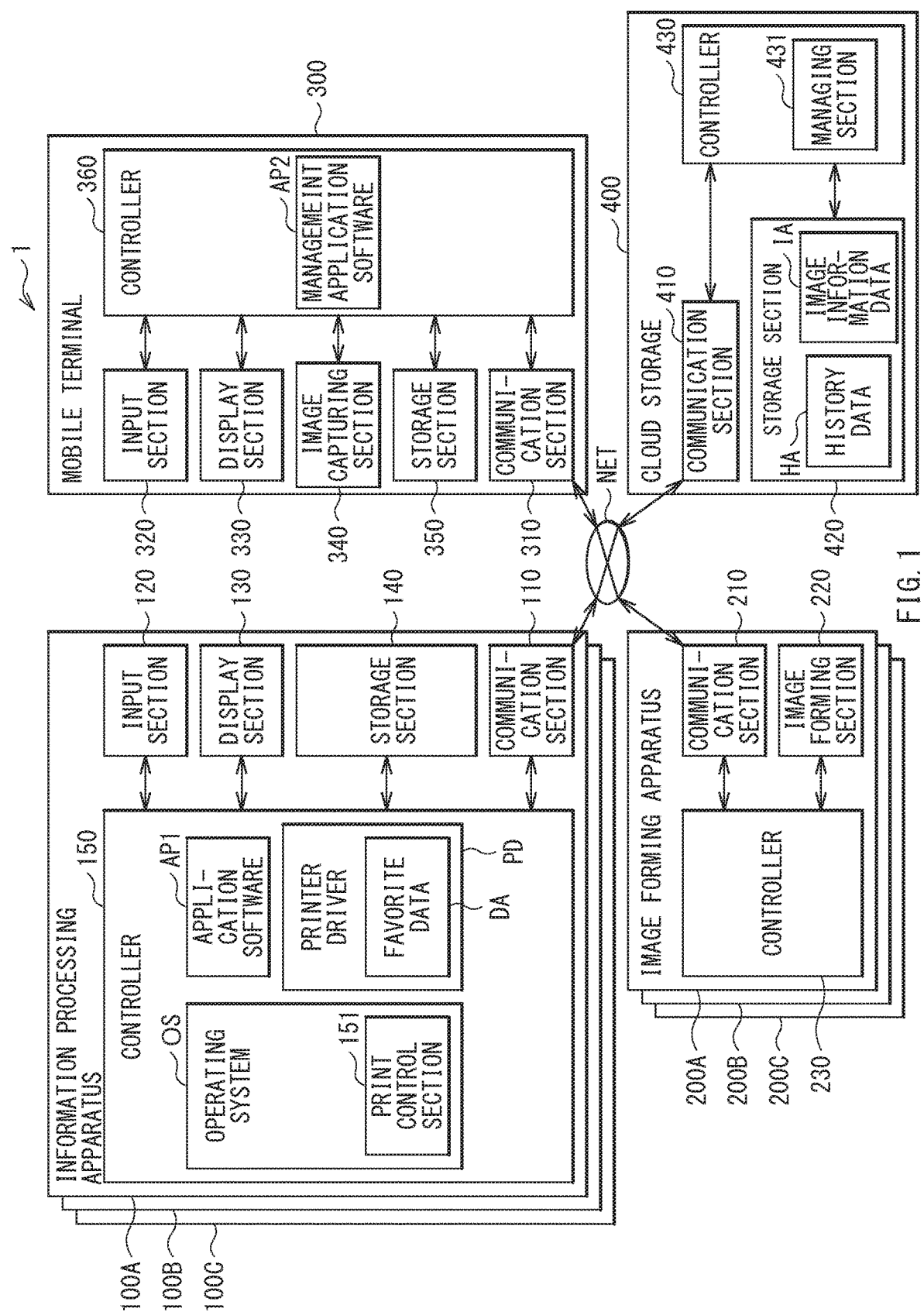
FIG. 1 is a block diagram illustrating an example of a configuration of an image processing system according to one example embodiment.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

Example Embodiment

Configuration Example

FIG. 1 illustrates an example of a configuration of an image processing system 1 that uses a preset information displaying method according to an example embodiment of the technology. The image processing system 1 may include a plurality of information processing apparatuses 100, a plurality of image forming apparatuses 200, a mobile terminal 300, and cloud storage 400. In this example, the image processing system 1 may include three information processing apparatuses 100A, 100B, and 100C as the information processing apparatuses 100, and include three image forming apparatuses 200A, 200B, and 200C as the image forming apparatuses 200. In the image processing system 1, the information processing apparatuses 100, the image forming apparatuses 200, the mobile terminal 300, and the cloud storage 400 may perform communication with each other via a network NET, for example. Non-limiting examples of the network NET may include a wired local area network (LAN) and a wireless LAN.

Hereinafter, each of the information processing apparatuses 100A, 100B, and 100C is sometimes simply referred to as the "information processing apparatus 100". A description below related to the information processing apparatus 100 may be similarly applicable to any of the information processing apparatuses 100A, 100B, and 100C. Hereinafter, each of the image forming apparatuses 200A, 200B, and 200C is sometimes simply referred to as the "image forming apparatus 200". A description below related to the image forming apparatus 200 may be similarly applicable to any of the image forming apparatuses 200A, 200B, and 200C. The information processing apparatus 100 may be a so-called personal computer, for example. The information processing apparatus 100 may be configured to perform various processes on the basis of user operation, i.e., operation performed by a user. Installed on the information processing apparatus 100 may be, for example but not limiting to, an operating system OS, application software AP1, and a printer driver PD which will all be described later. The printer driver PD may generate print data. The print data may include: information regarding an image to be printed; and setting values of various print setting items. The setting values may be used in a printing process. Further, the information processing apparatus 100 may be configured to transmit the print data to the image forming apparatus 200 on the basis of the user operation. The printer driver PD may allow pieces of favorite data D regarding the various print setting items to be registered in the printer driver PD. The favorite data D may include a setting value customized by the user. The information processing apparatus 100 may generate the print data on the basis of the favorite data D decided through user decision operation, i.e., decision operation performed by the user, out of a plurality of pieces of registered favorite data D. The information processing apparatus 100A may have a terminal name "PC001". The information processing apparatus 100B may have a terminal name "PC002". The information processing apparatus 100C may have a terminal name "PC003".

The image forming apparatus 200 may be a so-called printer. The image forming apparatus 200 may be configured to perform image formation operation with use of a developer on the basis of the print data received from the information processing apparatus 100, and thereby form an image on a recording medium. Non-limiting examples of the developer may include a toner. Non-limiting examples of the image may include a monochrome image and a color image. Non-limiting examples of the recording medium may include paper. The image forming apparatus 200A may have a printer name "Printer A". The image forming apparatus 200B may have a printer name "Printer B". The image forming apparatus 200C may have a printer name "Printer C".

The mobile terminal 300 may be, for example but not limited to, a smartphone or a tablet terminal. The mobile terminal 300 may be configured to perform various processes on the basis of the user operation. In this example, the mobile terminal 300 may capture an image on the basis of the user operation, transmit image data PIC representing a result of the image capturing to the cloud storage 400, and perform a process of causing the image data PIC to be registered in the cloud storage 400. The image to be captured may have been formed by the image forming apparatus 200 on the recording medium.

The cloud storage 400 may be, for example but not limited to, a so-called server. The cloud storage 400 may be configured to receive various requests and hold various pieces of data transmitted from the information processing apparatus 100 and the mobile terminal 300. For example, the cloud storage 400 may hold data such as the image data PIC transmitted from the mobile terminal 300.

In the image processing system 1, the information processing apparatus 100 may generate the print data on the basis of the favorite data D to be used, and the image forming apparatus 200 may form an image on the recording medium, such as paper, on the basis of the generated print data. The mobile terminal 300 may capture an image, such as the image formed on the recording medium by the image forming apparatus 200, on the basis of the user operation, and may thereby generate the image data PIC. Further, the mobile terminal 300 may cause the generated image data PIC to be registered in the cloud storage 400. Thus, a lot of pieces of image data PIC may be accumulated in the cloud storage 400. Thereafter, the information processing apparatus 100 may execute the application software AP1, and display a print setting screen SC. The print setting screen SC may be adapted to configure a print setting on the basis of the user operation. The information processing apparatus 100 may display a favorite's name list LI on the basis of the user operation performed on the print setting screen SC. The favorite's name list LI may present options of the pieces of favorite data D registered in the printer driver PD. The favorite's name list LI may be a list of favorite's names corresponding to the respective pieces of favorite data D. The information processing apparatus 100 may select the favorite data D on the basis of user selection operation, i.e., selection operation performed by the user, and thereby acquire the image data PIC corresponding to the selected favorite data D from the cloud storage 400. The information processing apparatus 100 may display: the favorite's name corresponding to the selected favorite data D; and the acquired image data PIC. The information processing apparatus 100 may decide the favorite data D to be used, on the basis of the user decision operation, and thereby generate the print data. The image forming apparatus 200 may perform the image formation operation on the basis of the generated print data. Thus, the image processing system 1 allows for improvement in user friendliness.

[Information Processing Apparatus 100]

The information processing apparatus 100 may include a communication section 110, an input section 120, a display section 130, a storage section 140, and a controller 150.

The communication section 110 may be configured to perform communication with the image forming apparatuses 200, the mobile terminal 300, and the cloud storage 400.

The input section 120 may be a device such as a mouse or a keyboard. The input section 120 may be configured to receive the user operation.

The display section 130 may be a device such as a liquid crystal display. The display section 130 may be configured to display a result of a process performed by the controller 150. In one specific but non-limiting example, the display section 130 may display information such as information representing a content of a process of the application software AP1 or information representing a content of a process of the printer driver PD.

The storage section 140 may be a device such as a hard disk drive (HDD) or a solid state drive (SSD). The storage section 140 may be configured to hold various pieces of data including, without limitation, various programs, various settings, and document data.

The controller 150 may be configured to execute any of the various programs and thereby perform a process corresponding to the executed program. The controller 150 may include, for example but not limited to, a processor and a random-access memory (RAM). The processor may be configured to execute a program. The controller 150 may be configured to execute the operating system OS, the application software AP1, and the printer driver PD.

The operating system OS may be configured to perform basic control of the information processing apparatus 100. For example, the controller 150 may execute the operating system OS, and thereby perform a process of efficiently managing each resource of hardware. Such a process may include, without limitation, memory management and task process management. The operating system OS may include a print control section 151. The print control section 151 may be configured to invoke the printer driver PD on the basis of an instruction, for example, given by the application software AP1.

In this example, the application software AP1 may be configured to perform an image editing process in accordance with the user operation. For example, the controller 150 may execute the application software AP1, and thereby perform a process in accordance with the application software AP1.

The printer driver PD may be, for example, a so-called device driver. The printer driver PD may be configured to generate the print data. The printer driver PD may be also configured to perform operation including, without limitation, operation of acquiring the image data PIC from the cloud storage 400 and operation of transmitting job data JD to the cloud storage 400. In one non-limiting example, the printer driver PD may be recorded in a medium such as a compact disc read-only memory (CD-ROM), and may be installed on the information processing apparatus 100 on the basis of the user operation. In another non-limiting example, the printer driver PD may be downloaded via the Internet on the basis of the user operation, and be installed on the information processing apparatus 100. Registered in the printer driver PD may be favorite data DA.

FIG. 2 illustrates an example of the favorite data DA. The favorite data DA may include one or more pieces of favorite data D. The favorite data D may include a favorite's name and setting information that includes setting values of various print setting items. The favorite's name may be a name of the favorite data D. The favorite's name may be represented by any combination of a character, a number, and a symbol, and may be freely set by the user. The print setting items in the setting information may include, without limitation, a "sheet size", a "sheet type", a "color mode", and a "resolution". The "sheet size" may indicate a size of the recording medium. The "sheet type" may indicate a type of the recording medium. The "color mode" may indicate an option such as monochrome image formation or color image formation. The "resolution" may be an index representing image roughness. For example, regarding the favorite data D having the "favorite's name" of "Event Coupon 2017", setting values of the "sheet size", the "sheet type", the "color mode", and the "resolution" are respectively "120×60 mm", "plane paper", "color printing", and "1200 dpi".

The controller 150 may execute the printer driver PD, and thereby instruct, on the basis of the user operation, the display section 130 to display the print setting screen SC. Further, the controller 150 may instruct, on the basis of the user operation, the display section 130 to display the favorite's name list LI. Further, the controller 150 may acquire history data HA, which will be described later, from the cloud storage 400 via the communication section 110. Further, the controller 150 may acquire, on the basis of the selection operation for the favorite data D performed by the user and the history data HA, the image data PIC corresponding to the selected favorite data D from the cloud storage 400 via the communication section 110. Further, the controller 150 may instruct the display section 130 to display the acquired image data PIC together with the favorite's name corresponding to the selected favorite data D. Further, the controller 150 may determine whether the decision operation for the favorite data D to be used has been received. Further, the controller 150 may read the setting information of the favorite data D to be used, on the basis of a result of the decision for the favorite data D. Further, the controller 150 may generate print data related to a print job on the basis of the read setting information. Further, the controller 150 may instruct the communication section 110 to transmit the generated print data to the image forming apparatus 200. Further, the controller 150 may generate job data JD, of the print job, that includes a data and time of printing, the favorite's name of the used favorite data D, and the printer name of the image forming apparatus 200 to perform the image formation operation. Further, the controller 150 may instruct the communication section 110 to transmit the generated job data JD to the cloud storage 400.

[Image Forming Apparatus 200]

The image forming apparatus 200 may include a communication section 210, an image forming section 220, and a controller 230. The communication section 210 may be configured to perform communication with the information processing apparatuses 100 and the mobile terminal 300. The image forming section 220 may be configured to perform, on the basis of an instruction given by the controller 230, the image formation operation on the recording medium with use of the developer such as the toner. The controller 230 may be configured to control the image formation operation of the image forming section 220 on the basis of the print data received by the communication section 210 from the information processing apparatus 100.

[Mobile Terminal 300]

The mobile terminal 300 may include a communication section 310, an input section 320, a display section 330, an image capturing section 340, a storage section 350, and a controller 360.

The communication section 310 may be configured to perform communication with the information processing apparatuses 100, the image forming apparatuses 200, and the cloud storage 400.

The input section 320 may be configured to receive the user operation. The input section 320 may include, for example but not limited to, various buttons and a touch panel.

The display section 330 may be a device such as a liquid crystal display. The display section 330 may be configured to display a result of a process performed by the controller 360. In one specific but non-limiting example, the display section 330 may display information such as information representing a content of a process of management application software AP2 which will be described later.

The image capturing section 340 may be configured to perform image capturing operation and thereby generate image data. In this example, the image capturing section 340 may capture the image formed on the recording medium, and thereby generate the image data PIC. The image capturing section 340 may include, for example but not limited to, an optical lens and a complementary metal oxide semiconductor (CMOS) image capturing device.

The storage section 350 may be a device such as an HDD or an SSD. The storage section 350 may be configured to hold various pieces of data including, without limitation, various programs, various settings, and the image data PIC.

The controller 360 may be configured to execute any of the various programs and thereby perform a process corresponding to the executed program. The controller 360 may include, for example but not limited to, a processor that is configured to execute the programs and a RAM. The controller 360 may be configured to execute the management application software AP2. The management application software AP2 may be configured to select, on the basis of the user selection operation, the data to be transmitted to the cloud storage 400. For example, the controller 360 may execute the management application software AP2, and thereby instruct the communication section 310 to receive the later-described history data HA transmitted from the cloud storage 400. Further, the controller 360 may instruct, on the basis of the user operation, the display section 330 to display a registration screen PH2. The registration screen PH2 may be adapted to select the data to be transmitted to the cloud storage 400. Further, the controller 360 may select, on the basis of the user selection operation: the image data PIC to be transmitted to the cloud storage 400; and history data H, out of the history data HA, to be associated with the image data PIC. The history data H will be described later. Further, the controller 360 may instruct the communication section 310 to transmit, to the cloud storage 400, the history data H selected through the user selection operation and the image data PIC selected through the user selection operation.

[Cloud Storage 400]

The cloud storage 400 may include a communication section 410, a storage section 420, and a controller 430.

The communication section 410 may be configured to perform communication with the information processing apparatuses 100 and the mobile terminal 300.

The storage section 420 may be a device such as an HDD or an SSD. The storage section 420 may be configured to hold various pieces of data. The storage section 420 may hold the history data HA and image information data IA. The history data HA may be a database representing a history of the image formation operation performed by the image forming apparatuses 200. The image information data IA may be a database in which image information data I is to be registered. The image information data I may be information regarding the image data PIC.

FIG. 3 illustrates an example of the history data HA. The history data HA may include one or more pieces of history data H. In this example, the history data HA may include pieces of history data H1 to H5. The history data H may be based on the job data JD received from the information processing apparatus 100 via the communication section 410. The history data H may include information regarding a "history identifier", a "print instructing terminal", a "print performing printer", a "date and time of printing", a "favorite's name", and an "image identifier". The "history identifier" may be information to identify the history data H. The "print instructing terminal" may be, for example, the terminal name of the information processing apparatus 100 that has transmitted the print data to the image forming apparatus 200. The "print performing printer" may be, for example, the printer name of the image forming apparatus 200 that has performed the image formation operation. The "date and time of printing" may be a date and time at which the information processing apparatus 100 has transmitted the print data to the image forming apparatus 200. The "favorite's name" may be, for example, the favorite's name of the used favorite data D. The "image identifier" may be information indicating the image data PIC corresponding to the history data H. In this example, the "image identifier" of the history data H1 is not registered. The "image identifier" of the history data H2 is "IMG053", the "image identifier" of the history data H3 is "IMG052", the "image identifier" of the history data H4 is "IMG050", and the "image identifier" of the history data H5 is "IMG051".

FIG. 4 illustrates an example of the image information data IA. The image information data IA may include one or more pieces of image information data I. In this example, the image information data IA may include pieces of image information data I1 to I5. The image information data I may include information regarding an "image identifier", a "date and time of registration", "image data" and a "history identifier". The "image identifier" may be information to identify the image data PIC. The "date and time of registration" may be, for example, a date and time at which the image information data I has been registered in the image information data IA. The "image data" may be, for example, the image data PIC transmitted from the mobile terminal 300. The "history identifier" may be information indicating the history data H corresponding to the image information data I.

The history data H in the history data HA illustrated in FIG. 3 and the image information data I in the image information data IA illustrated in FIG. 4 may be associated with each other with use of the "history identifier" and the "image identifier". For example, the "image identifier" of the history data H2 is "IMG053" and the "image identifier" of the image information data I1 is also "IMG053". Therefore, the history data H2 may be associated with the image information data I1. Similarly, the "image identifier" of the history data H3 is "IMG052" and the "image identifier" of the image information data I2 is also "IMG052". Therefore, the history data H3 may be associated with the image information data I2. The "image identifier" of the history data H4 is "IMG050" and the "image identifier" of the image information data I4 is also "IMG050". Therefore, the history data H4 may be associated with the image information data I4. The "image identifier" of the history data H5 is "IMG051" and the "image identifier" of the image information data I3 is also "IMG051". Therefore, the history data H5 may be associated with the image information data I3.

The controller 430 may be configured to control operation of the respective blocks in the cloud storage 400 and thereby control overall operation of the cloud storage 400. The controller 430 may include a managing section 431. The managing section 431 may be configured to manage the history data HA and the image information data IA that are stored in the storage section 420. In one specific but non-limiting example, the controller 430 may instruct the communication section 410 to receive the job data JD transmitted from the information processing apparatus 100, and the managing section 431 may register the received job data JD in the history data HA as the history data H. Further, the controller 430 may instruct the communication section 410 to receive the image data PIC transmitted from the mobile terminal 300. The managing section 431 may generate the image information data I on the basis of the received image data PIC, and register the generated image information data I in the image information data IA. Further, the managing section 431 may identify, on the basis of an instruction given by the information processing apparatus 100, the image data PIC corresponding to the favorite data D selected through the user selection operation. The controller 430 may instruct the communication section 410 to transmit the identified image data PIC to the information processing apparatus 100.

The history data HA and the image information data IA may correspond to a "database" in one specific but non-limiting embodiment of the technology. The favorite data D may correspond to "first preset information" and "second preset information" in one specific but non-limiting embodiment of the technology. The favorite's name list LI may correspond to a "list" in one specific but non-limiting embodiment of the technology. The image data PIC may correspond to "first image information", "second image information", and "third image information" in one specific but non-limiting embodiment of the technology. The information processing apparatus 100 may correspond to an "information processing apparatus" in one specific but non-limiting embodiment of the technology. The cloud storage 400 may correspond to a "storage device" in one specific but non-limiting embodiment of the technology. The controller 150 may correspond to a "display processor" in one specific but non-limiting embodiment of the technology.

[Operation and Example Workings]

Next, a description is given of operation and example workings of the image processing system 1 according to the example embodiment.

[Outline of Overall Operation]

First, a description is given of an outline of overall operation of the image processing system 1, with reference to FIGS. 1 to 4. In the image processing system 1, the information processing apparatus 100 may generate the print data on the basis of the favorite data D to be used, and the image forming apparatus 200 may form an image on the recording medium, such as paper, on the basis of the generated print data. The mobile terminal 300 may capture, on the basis of the user operation, the image formed by the image forming apparatus 200 on the recording medium, for example, and thereby generate the image data PIC. Further, the mobile terminal 300 may perform a process of registering the generated image data PIC in the cloud storage 400. The cloud storage 400 may receive the image data PIC transmitted from the mobile terminal 300, and thereby register, in the image information data IA, the image information data I including the image data PIC. The information processing apparatus 100 may execute the application software AP1, and cause the print setting screen SC, adapted to configure a print setting, to be displayed on the basis of the user operation. The information processing apparatus 100 may cause the favorite's name list LI to be displayed on the basis of the user operation performed on the print setting screen SC. The information processing apparatus 100 may acquire the history data HA from the cloud storage 400. The information processing apparatus 100 may acquire the image data PIC in the image information data I from the cloud storage 400 on the basis of the selection operation for the favorite data D performed by the user and the history data HA. The image data PIC to be acquired may correspond to the selected favorite data D. The information processing apparatus 100 may cause the acquired image data PIC to be displayed together with the favorite's name corresponding to the selected favorite data D. The information processing apparatus 100 may determine, on the basis of the user decision operation, whether the decision operation for the favorite data D to be used has been received. In a case where the decision operation has been received, the information processing apparatus 100 may read, on the basis of a result of the decision for the favorite data D, the setting information of the favorite data D to be used. The information processing apparatus 100 may generate print data on the basis of the user operation, and transmit the generated print data to the image forming apparatus 200. The image forming apparatus 200 may perform the image formation operation on the basis of the received print data.

[Detailed Operation]

A detailed description is given below of a printing process and a registration process to be performed in the image processing system 1.

[Printing Process]

Figure 5:
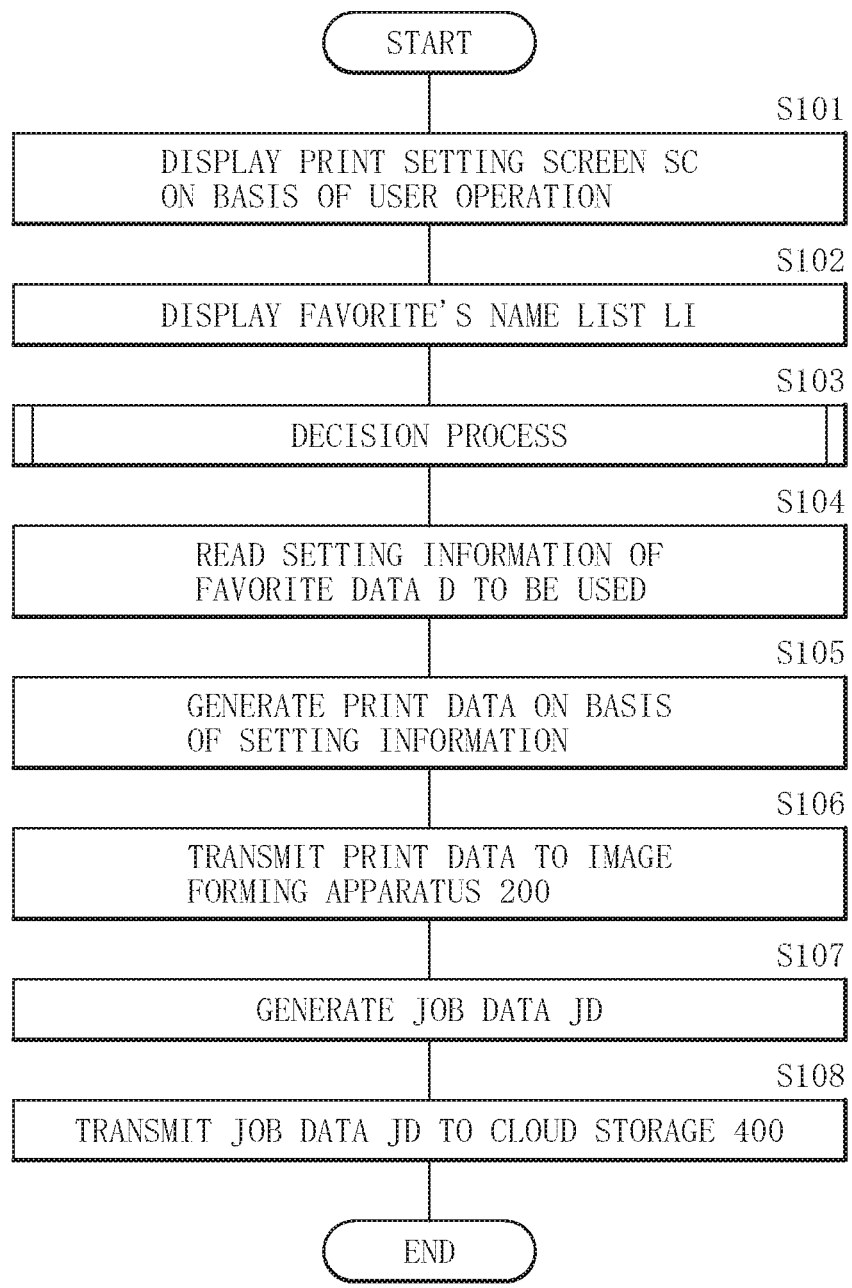
FIG. 5 is a flowchart illustrating an example of a process to be performed by an information processing apparatus illustrated in FIG. 1.

FIG. 5 illustrates an example of operation of the printing process to be performed by the information processing apparatus 100. For example, the user may operate the application software AP1 and thereby edit image data. In response to the operation, performed by the user, to instruct printing, the application software AP1 may instruct, on the basis of such user operation, the print control section 151 to invoke the printer driver PD. The display section 130 may display, on the basis of an instruction given by the invoked printer driver PD, a printing screen adapted to perform printing. A process may be thus started. This operation is described in detail below.

First, the display section 130 may display, on the basis of the user operation performed on the printing screen, the print setting screen SC adapted to configure the print setting (step S101). In one specific but non-limiting example, the input section 120 may receive the user operation on the printing screen. The printer driver PD may instruct, on the basis of the received user operation, the display section 130 to display the print setting screen SC. Further, the display section 130 may display the print setting screen SC on the basis of the instruction given by the printer driver PD.

Figure 6:
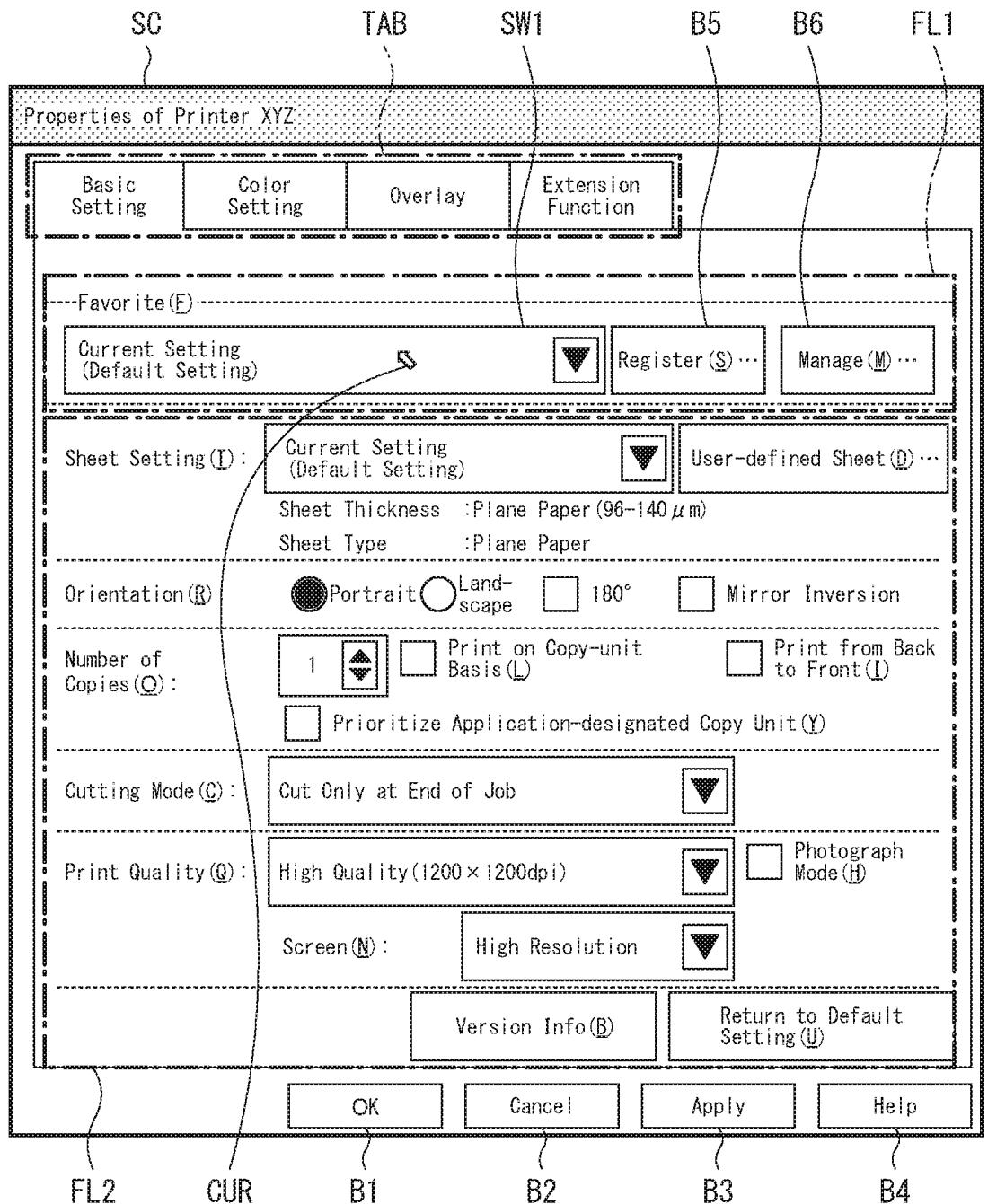
FIG. 6 is an image diagram illustrating an example of a display screen to be used in a process illustrated in FIG. 5.

FIG. 6 illustrates the print setting screen SC in step S101. The print setting screen SC may include a setting switching tab TAB, a favorite's field FL1, a setting input field FL2, an OK button B1, a cancel button B2, an apply button B3, and a help button B4.

The setting switching tab TAB may be a switch adapted to switch the displayed setting item. For example, the user may select "Basic Setting". In response thereto, basic setting items including, without limitation, sheet setting may be displayed.

The favorite's field FL1 may be adapted to select the favorite data D to be used out of the favorite data DA. The favorite's field FL1 may include a pull-down menu SW1, a register button B5, and a manage button B6. The pull-down menu SW1 may display the favorite's name list LI and may be configured to receive the user selection operation. In a case of receiving the user decision operation, the pull-down menu SW1 may display the favorite's name decided by the user. The register button B5 may be adapted to register the favorite data D in the favorite data DA, for example. The manage button B6 may be adapted to manage the favorite data DA, for example.

The setting input field FL2 may be adapted to set the setting values of the various print setting items. In this example, the user may be allowed to set the setting values of the print setting items including, without limitation, a "sheet setting", an "orientation", and "number of copies" in the setting input field FL2.

The OK button B1 may be adapted to apply the setting values of the various print setting items to the print data, and to return to the printing screen. The cancel button B2 may be adapted to prevent the setting values of the various print setting items from being applied to the print data, and to end displaying the print setting screen SC. The apply button B3 may be adapted to apply the setting values of the various print setting items to the print data. The help button B4 may be adapted to display a description of the setting values of the various print setting items on the print setting screen SC.

Thereafter, the display section 130 may display the favorite's name list LI on the basis of the user operation (step S102). In one specific but non-limiting example, the input section 120 may receive the user operation performed on the pull-down menu SW1 in the print setting screen SC. The printer driver PD may acquire, on the basis of the received user operation, the favorite's names corresponding to all pieces of favorite data D included in the favorite data DA. In this example, the printer driver PD may acquire the favorite's names "Event Coupon 2017", "Event Coupon 2018", "Ticket 01", "Ticket 02", "Ticket 03", "Ticket 04", "Label 001", "Label 002 (Star)", "Label 003", "Label 004 (Round)", "Label 005", and "Label 006". The printer driver PD may instruct the display section 130 to display the favorite's name list LI including these favorite's names. Further, the display section 130 may display the favorite's name list LI on the basis of the instruction given by the printer driver PD.

Thereafter, the printer driver PD may perform a decision process of deciding the favorite data D to be used (step S103).

Figure 7:
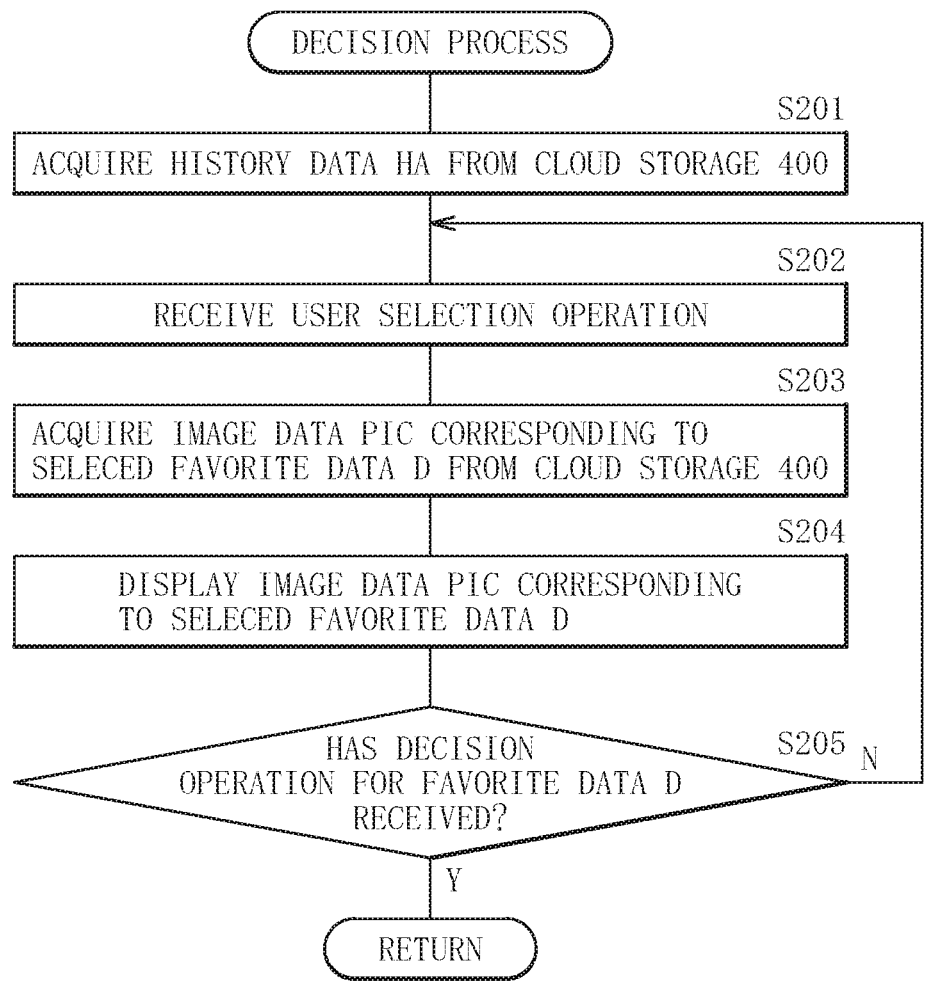
FIG. 7 is another flowchart illustrating an example of the process to be performed by the information processing apparatus illustrated in FIG. 1.

FIG. 7 illustrates an example of operation of the decision process in step S103. The decision process is described below in detail.

First, the printer driver PD may acquire the history data HA from the cloud storage 400 via the communication section 110 (step S201). In this example, the printer driver PD may acquire the pieces of history data H1 to H5 from the cloud storage 400.

Thereafter, the input section 120 may receive the user selection operation performed on the favorite's name list LI (step S202). In one specific but non-limiting example, the input section 120 may allow the user to move a cursor CUR to a position of any of the favorite's names included in the favorite's name list LI, and thereby receive the selection operation of selecting the favorite data D corresponding to the favorite's name at the position.

Thereafter, the printer driver PD may acquire, on the basis of the selection operation for the favorite data D performed by the user and the history data HA, the image data PIC corresponding to the selected favorite data D from the cloud storage 400 (step S203). In one specific but non-limiting example, the printer driver PD may determine whether the history data HA includes the history data H including the favorite's name of the favorite data D selected through the user selection operation. In a case where the history data HA includes the history data H including the favorite's name of the selected favorite data D, the printer driver PD may acquire the image identifier included in the history data H. For example, in a case where the history data HA includes a plurality of pieces of history data H including the favorite's name of the selected favorite data D, the printer driver PD may acquire the image identifier included in the history data H, out of the plurality of pieces of history data H, that has the latest date and time of printing. The printer driver PD may search, via the communication section 110, for the image information data I including the acquired image identifier in the image information data IA in the cloud storage 400, and acquire the image data PIC of the image information data I.

Thereafter, the display section 130 may display, on the basis of an instruction given by the printer driver PD, the image data PIC corresponding to the selected favorite data D (step S204). In one specific but non-limiting example, the printer driver PD may instruct the display section 130 to display: the favorite's name corresponding to the selected favorite data D; and the image data PIC acquired in step S203 together. Further, the display section 130 may display, on the basis of the instruction given by the printer driver PD, the image data PIC corresponding to the selected favorite data D.

Figure 8:
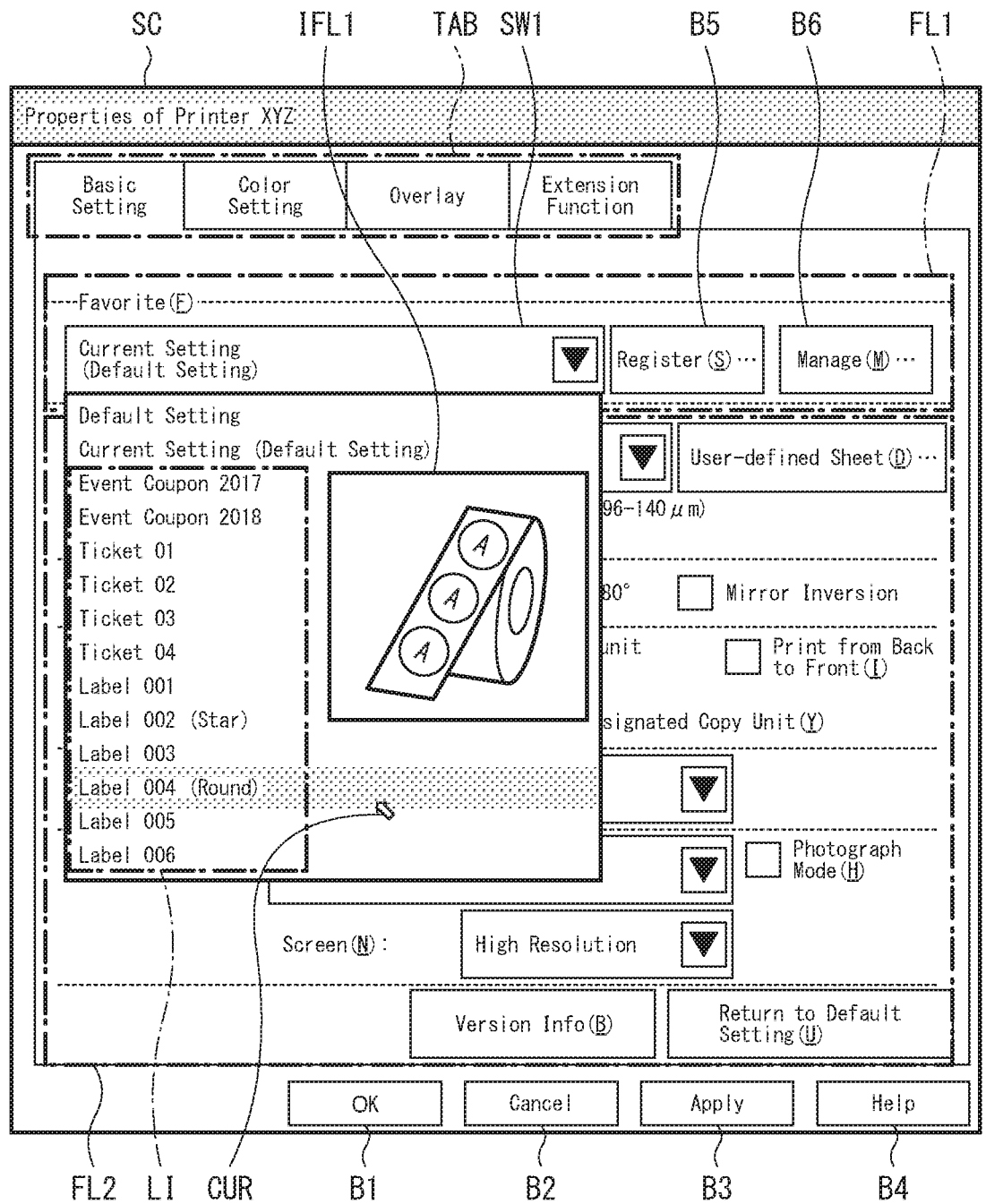
FIG. 8 is an image diagram illustrating an example of the display screen to be used in a process illustrated in FIG. 7.

FIG. 8 illustrates the print setting screen SC in step S204. The print setting screen SC may include the favorite's name list LI and an image field IFL1. The image field IFL1 may be adapted to display the image data PIC corresponding to the selected favorite data D. In this example, "Default Setting" and "Current Setting (Default Setting)" are displayed in addition to the favorite's name list LI. In this example, the input section 120 may allow the user to move the cursor CUR to the position of the "Label 004 (Round)", and thereby receive the selection operation of selecting the favorite data D corresponding to the "Label 004 (Round)". Further, the printer driver PD may acquire "IMG053" that is the image identifier of the history data H2 corresponding to the selected favorite data D out of the plurality of pieces of history data H (in this example, the pieces of history data H1 to H5) included in the history data HA. The printer driver PD may acquire the image data PIC of the image information data I1 having the image identifier "IMG053" in the image information data IA. Further, the display section 130 may display the acquired image data PIC in the image field IFL1. In this example, the printer driver PD may acquire "IMG053" that is the image identifier of the history data H2 corresponding to the selected favorite data D; however, this is non-limiting. Alternatively, for example, the printer driver PD may acquire the image identifier of another history data H corresponding to the selected favorite data D.

Thereafter, the printer driver PD may determine whether the input section 120 has received the decision operation for the favorite data D (step S205). In one specific but non-limiting example, in a case where the input section 120 is a mouse, the printer driver PD may determine whether the decision operation for the favorite data D to be used has been received, on the basis of click operation performed by the user. In a case where the user has performed the decision operation, the favorite data D may determine that the decision operation for the favorite data D corresponding to the selected favorite's name has been received. In a case where the input section 120 has received the decision operation for the favorite data D ("Y" in step S205), the process may be brought to an end. In a case where the input section 120 has not received the decision operation for the favorite data D ("N" in step S205), the process may be caused to return to step S202. This may be the end of the flow.

Thereafter, as illustrated in FIG. 5, the printer driver PD may read, on the basis of a result of the decision for the favorite data D, the setting information of the favorite data D to be used (step S104). In one specific but non-limiting example, the printer driver PD may read, on the basis of the result of the decision for the favorite data D, the setting information of the favorite data D to be used from the favorite data DA. Further, the printer driver PD may switch the favorite's name of the favorite data D displayed on the pull-down menu SW1 to the favorite's name of the favorite data D to be used, and switch each of the setting values displayed in the setting input field FL2 to corresponding one of the setting values of the favorite data D to be used.

Thereafter, the printer driver PD may generate the print data on the basis of the setting information of the favorite data D to be used (step S105). In one specific but non-limiting example, the input section 120 may receive the user operation performed on the OK button B1 in the print setting screen SC. In response thereto, the print setting screen SC may be closed. The input section 120 may further receive the user operation performed on the printing screen. In response thereto, the printer driver PD may generate the print data.

Thereafter, the communication section 110 may transmit, on the basis of an instruction given by the printer driver PD, the print data to the image forming apparatus 200 (step S106). In response thereto, the image forming apparatus 200 may form an image on the basis of the received print data.

Thereafter, the printer driver PD may generate the job data JD (step S107). In one specific but non-limiting example, the printer driver PD may generate the job data JD that is information regarding the print job related to the transmitted print data. In this example, the job data JD may include information regarding the print instructing terminal, the print performing printer, the date and time of printing, and the favorite's name of the used favorite data D.

Thereafter, the communication section 110 may transmit the job data JD to the cloud storage 400 on the basis of an instruction given by the printer driver PD (step S108).

This may be an end of the flow.

Figure 9:
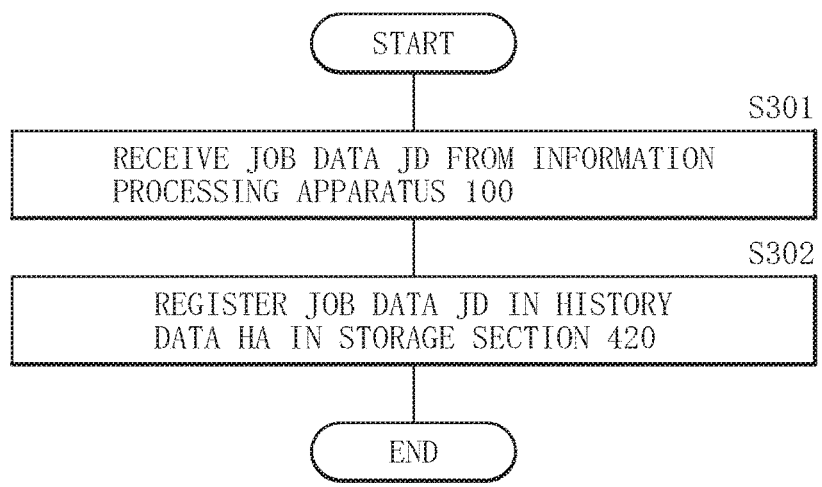
FIG. 9 is a flowchart illustrating an example of a process to be performed by cloud storage illustrated in FIG. 1.

FIG. 9 illustrates an example of operation of a process to be performed by the cloud storage 400. A description is given below of a process to be performed in a case where the cloud storage 400 receives the job data JD transmitted from the information processing apparatus 100 in step S108.

First, the communication section 410 may receive the job data JD transmitted from the information processing apparatus 100 (step S301). Thereafter, the managing section 431 may register the received job data JD in the history data HA in the storage section 420 on the basis of the job data JD received by the communication section 410 (step S302). In one specific but non-limiting example, the managing section 431 may provide a history identifier to the job data JD, and register the job data JD and the history identifier in the history data HA as the history data H. This may be an end of the flow.

[Registration Process]

Figure 10:
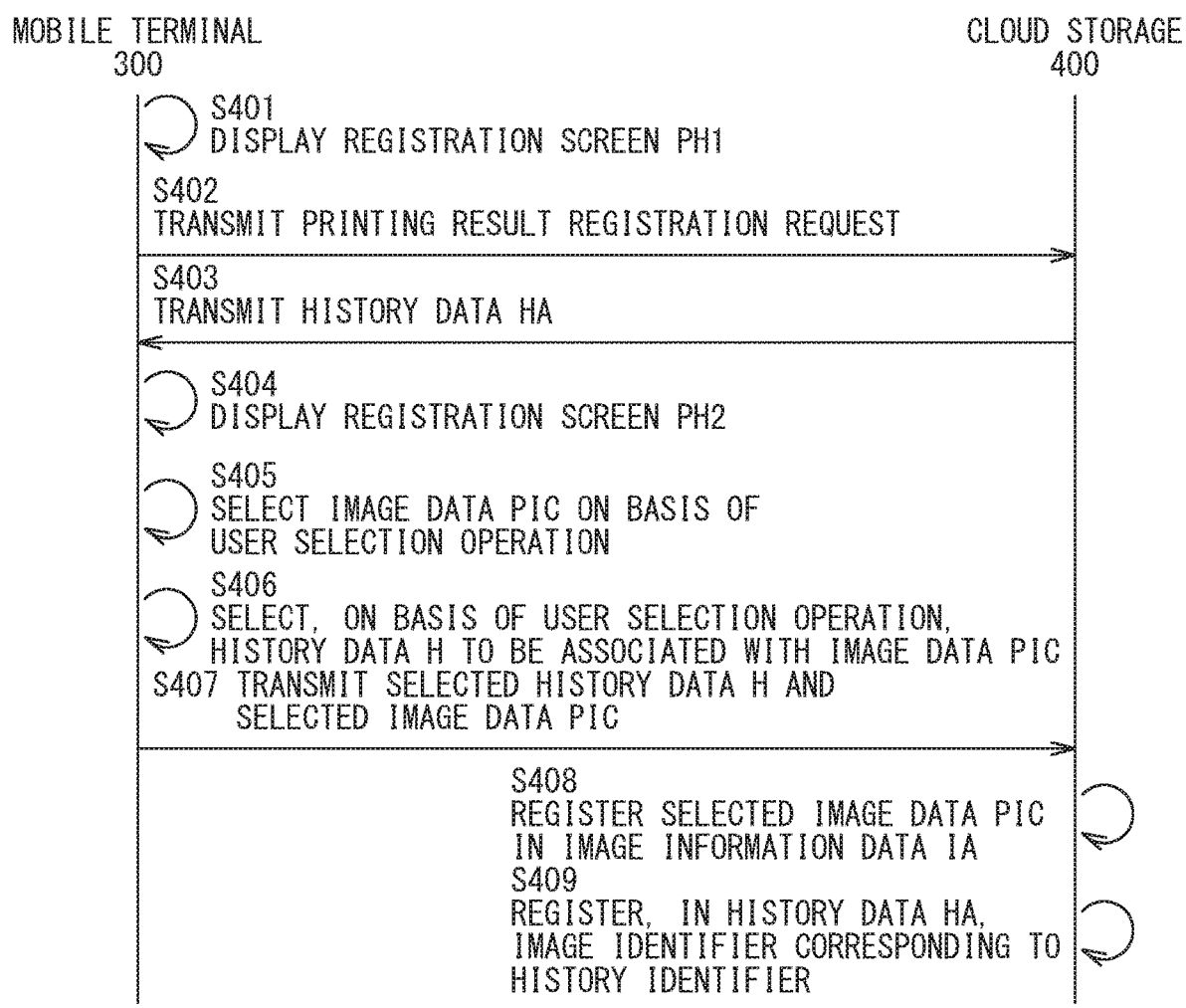
FIG. 10 is a sequence diagram illustrating an example of a process to be performed by a mobile terminal and the cloud storage illustrated in FIG. 1.

FIG. 10 illustrates an example of operation of a registration process to be performed by the mobile terminal 300 and the cloud storage 400. The registration process may involve: generating the image information data I on the basis of the image data PIC generated by capturing the image formed on the recording medium through the printing process illustrated in FIG. 5; and registering the generated image information data I in the image information data IA as a printing result. This operation is described below in detail.

First, the mobile terminal 300 may display a registration screen PH1 on the basis of the user operation (step S401). The registration screen PH1 may be adapted to make a printing result registration request to the cloud storage 400. In one specific but non-limiting example, the management application software AP2 may instruct, on the basis of the user operation, the display section 330 to display the registration screen PH1. Further, the display section 330 may display the registration screen PH1 on the basis of the instruction given by the management application software AP2.

Figure 11:
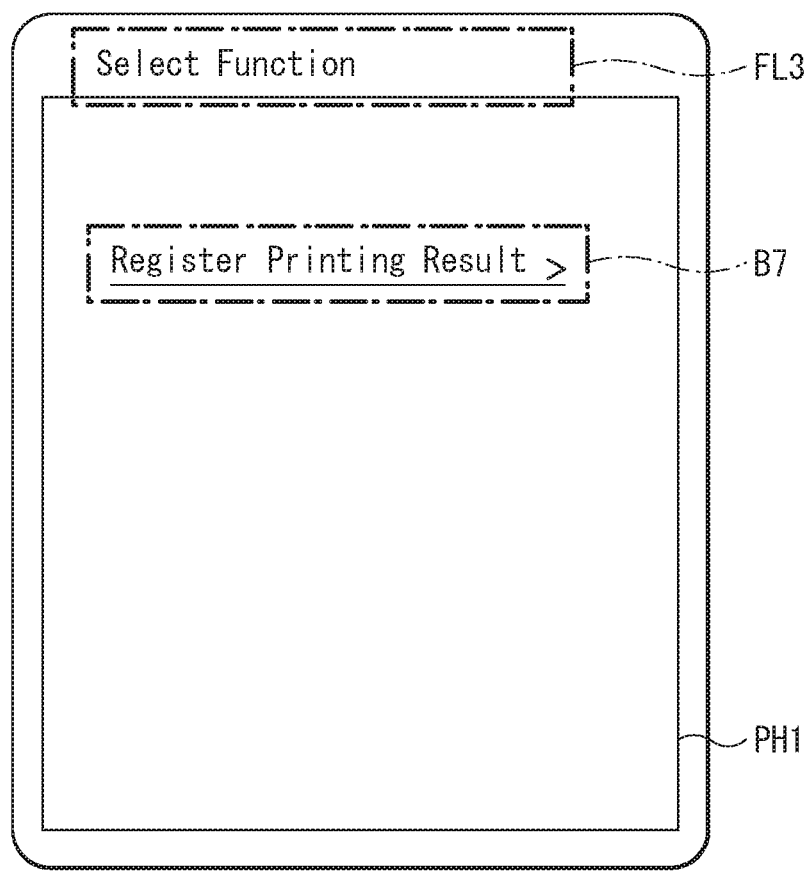
FIG. 11 is an image diagram illustrating an example of a display screen to be used in a process illustrated in FIG. 10.

FIG. 11 illustrates the registration screen PH1. The registration screen PH1 may include a header display field FL3 and a start button B7. The header display field FL3 may be adapted to display information such as a screen title of the registration screen PH1. The start button B7 may be adapted to make the printing result registration request to the cloud storage 400.

Thereafter, the mobile terminal 300 may transmit the printing result registration request to the cloud storage 400 on the basis of the user operation (step S402). In one specific but non-limiting example, the input section 320 may receive the user operation performed on the start button B7 in the registration screen PH1. The management application software AP2 may instruct, on the basis of the received user operation, the communication section 310 to transmit the printing result registration request to the cloud storage 400. Further, the communication section 310 may transmit the printing result registration request to the cloud storage 400 on the basis of the instruction given by the management application software AP2. The communication section 410 of the cloud storage 400 may receive the transmitted printing result registration request.

Thereafter, the cloud storage 400 may transmit the history data HA to the mobile terminal 300 on the basis of the printing result registration request (step S403). In one specific but non-limiting example, the controller 430 may instruct, on the basis of the received printing result registration request, the communication section 410 to transmit the history data HA to the mobile terminal 300. Further, the communication section 410 may transmit the history data HA to the mobile terminal 300 on the basis of the instruction given by the controller 430. The communication section 310 of the mobile terminal 300 may receive the transmitted history data HA.

Thereafter, the mobile terminal 300 may display the registration screen PH2 on the basis of the history data HA (step S404). The registration screen PH2 may be adapted to select data to be transmitted to the cloud storage 400. In one specific but non-limiting example, the management application software AP2 may instruct, on the basis of the history data HA, the display section 330 to display the registration screen PH2 adapted to select the data to be transmitted to the cloud storage 400. Further, the display section 330 may display the registration screen PH2.

Figure 12:
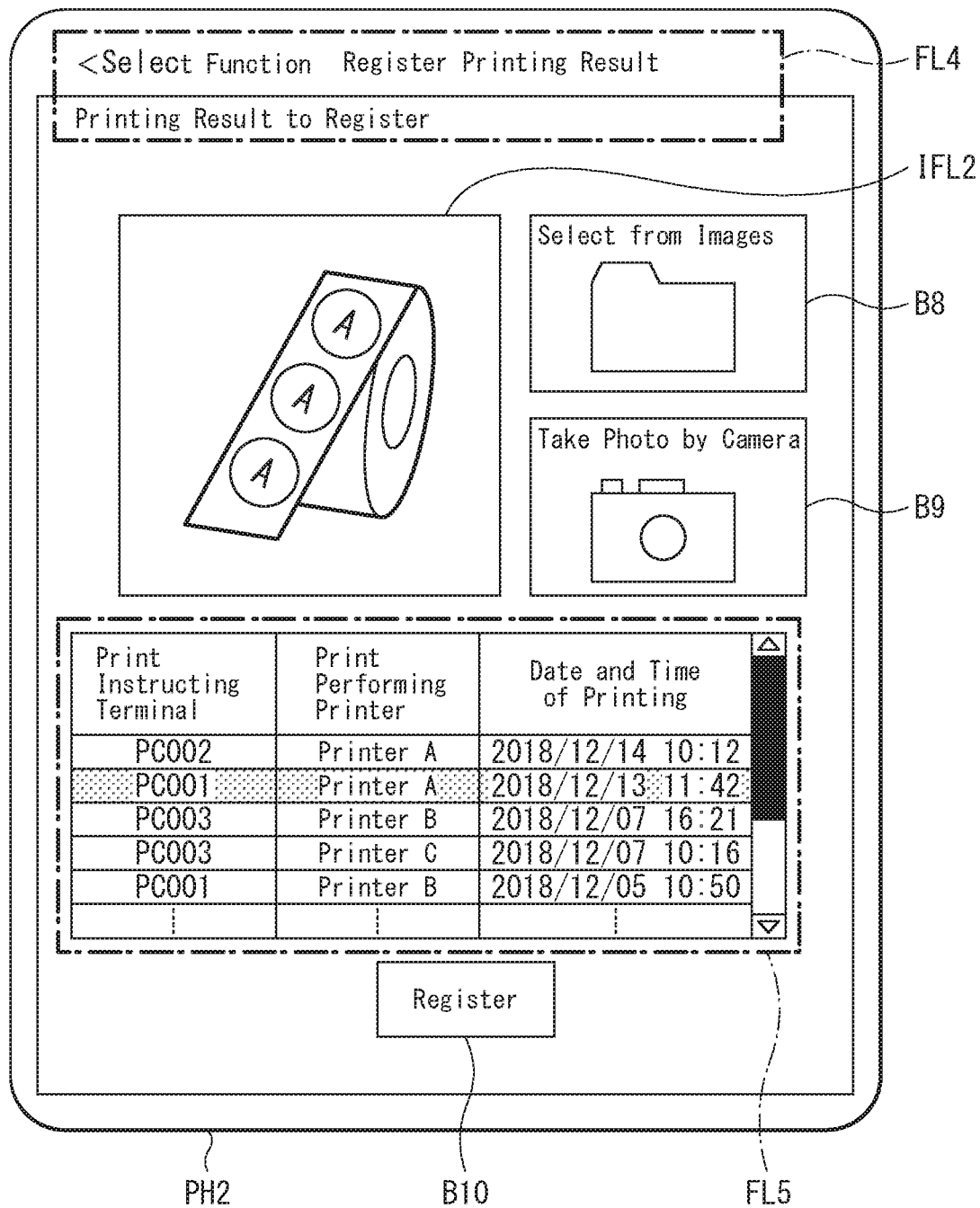
FIG. 12 is another image diagram illustrating an example of a display screen to be used in the process illustrated in FIG. 10.

FIG. 12 illustrates the registration screen PH2. The registration screen PH2 may include a header display field FL4, an image field IFL2, a select button B8, an image capture button B9, a selection field FL5, and a register button B10. The header display field FL4 may be adapted to display information such as a screen title of the registration screen PH2 or a sub-title. The image field IFL2 may be adapted to display the image data PIC to be transmitted to the cloud storage 400. The select button B8 may be operated upon selecting, from the image data PIC stored in the storage section 350, the image data PIC to be transmitted to the cloud storage 400. The image capture button B9 may be operated upon causing the image capturing section 340 to generate the image data PIC that is to be transmitted to the cloud storage 400. The selection field FL5 may be adapted to display the history data HA received by the communication section 310 in step S403. The selection field FL5 may be also adapted to select the history data H to be associated with the image data PIC that is to be transmitted to the cloud storage 400. The register button B10 may be adapted to transmit, to the cloud storage 400, the history data H and the image data PIC each selected through the user selection operation. Note that, at the time when the registration screen PH2 is displayed, for example, the image data PIC may not have been selected yet, and the image data PIC may not be displayed in the image field IFL2 accordingly. In the selection field FL5, the history data H may not have been selected yet, and the history data H may not be highlighted accordingly.

Thereafter, the mobile terminal 300 may select, on the basis of the user selection operation, the image data PIC which the mobile terminal 300 is to transmit to the cloud storage 400 (step S405). In one specific but non-limiting example, in a case where the input section 320 receives the user operation performed on the select button B8, the management application software AP2 may instruct the display section 330 to display a list of the image data PIC stored in the storage section 350. Further, the display section 330 may display the list of the image data PIC. The management application software AP2 may select, on the basis of the user selection operation performed on the list of the image data PIC, the image data PIC to be transmitted to the cloud storage 400. Further, the display section 330 may display the selected image data PIC in the image field IFL2. In another specific but non-limiting example, in a case where the input section 320 receives the user operation performed on the image capture button B9, the management application software AP2 may instruct, on the basis of the received user operation, the image capturing section 340 to capture the image formed on the recording medium and to thereby generate the image data PIC. Further, the image capturing section 340 may generate the image data PIC to be transmitted to the cloud storage 400. Further, the display section 330 may display the generated image data PIC in the image field IFL2. The management application software AP2 may thus select the image data PIC which the mobile terminal 300 is to transmit to the cloud storage 400.

Thereafter, the mobile terminal 300 may select, on the basis of the user selection operation, the history data H to be associated with the image data PIC (step S406). In one specific but non-limiting example, the input section 320 may receive the user selection operation performed on the history data H in the selection field FL5. The management application software AP2 may instruct, on the basis of the user selection operation, the display section 330 to highlight the selected history data H. Further, the display section 330 may highlight the selected history data H. The management application software AP2 may thus select, on the basis of the received user selection operation, the history data H to be associated with the image data PIC.

Thereafter, the mobile terminal 300 may transmit the selected history data H and the selected image data PIC to the cloud storage 400 (step S407). In one specific but non-limiting example, the input section 320 may receive the user operation performed on the register button B10 in the registration screen PH2. The management application software AP2 may instruct, on the received user operation, the communication section 310 to transmit the selected history data H and the selected image data PIC to the cloud storage 400. Further, the communication section 310 may transmit the selected history data H and the selected image data PIC to the cloud storage 400 on the basis of the instruction given by the management application software AP2. The communication section 410 of the cloud storage 400 may receive the selected history data H and the selected image data PIC.

Thereafter, the cloud storage 400 may register the selected image data PIC in the image information data IA (step S408). In one specific but non-limiting example, the managing section 431 may provide an image identifier to the selected image data PIC. The managing section 431 may generate the image information data I on the basis of the provided image identifier, the image data PIC, and the history identifier of the selected history data H, and register the generated image information data I in the image information data IA. Upon registering the image information data I, the managing section 431 may further register a date and time at this timing as the date and time of registration of the image information data I.

Thereafter, the cloud storage 400 may register, in the history data H, the image identifier corresponding to the history identifier (step S409). In one specific but non-limiting example, the managing section 431 may search for data same as the selected history data H among the plurality of pieces of history data H in the history data HA. Further, the managing section 431 may register the image identifier which the managing section 431 has provided in step S408, as the image identifier of the searched history data H in the history data HA.

This may be an end of the flow.

As described above, in the image processing system 1, the favorite data D used upon performing the printing process and the image data PIC representing the result of the printing process may be registered, in the history data HA and the image information data IA, in a state of being associated with each other. Further, the favorite data D and the image data PIC associated with the favorite data D may be displayed in correspondence with each other on the print setting screen SC that receives the selection operation for the favorite data D. This makes it easier for the user to recognize the favorite data D used in the past even in a case where the number of pieces of the registered favorite data D increases in the image processing system 1. Accordingly, for example, in a case where the user wants to newly print something similar to what the user has printed in the past with use of certain favorite data D, the user is allowed to easily recognize the favorite data D which the user has used in the past. This makes it easier for the user to find the favorite data D to be used. As a result, the image processing system 1 contributes to improvement in user friendliness.

In one example embodiment, in the image processing system 1, the selection operation for the favorite data D may be received on the print setting screen SC, and the selected favorite data D and the image data PIC associated with the selected favorite data D may be displayed in correspondence with each other on the print setting screen SC. This may allow the image data PIC associated with the selected favorite data D to be displayed larger in size, for example, making it easier for the user to recognize the printing result. As a result, it is possible to improve user friendliness.

Moreover, in the image processing system 1, the cloud storage 400 may hold the history data HA and the image information data IA. This may allow the history data HA to include pieces of information regarding the job data JD transmitted from the plurality of information processing apparatuses 100, for example. This may also allow the image information data IA to include printing results (i.e., pieces of image data PIC) of the plurality of information processing apparatuses 100, for example. Accordingly, for example, in a case where the user operates the information processing apparatus 100A and thereby selects the favorite data D, for example, not only the image data PIC related to the printing result of the information processing apparatus 100A but also the image data PIC related to the printing result of the information processing apparatus 100B may be displayed. This makes it further easier to find the favorite data D to be used.

Example Effects

As described above, according to the example embodiment, favorite data used upon performing a printing process and image data representing a result of the printing process may be registered, in history data and image information data, in a state of being associated with each other. Further, the favorite data and the image data associated with the favorite data may be displayed in correspondence with each other on a print setting screen that receives selection operation for the favorite data. This makes it easier to find the favorite data to be used even in a case where the number of pieces of the registered favorite data increases. As a result, it is possible to improve user friendliness.

According to the example embodiment, the selection operation for the favorite data may be received on the print setting screen, and the selected favorite data and the image data associated with the selected favorite data may be displayed in correspondence with each other on the print setting screen. This allows the image data associated with the selected favorite data to be displayed larger in size, for example. As a result, it is possible to improve user friendliness.

According to the example embodiment, cloud storage may hold the history data and the image information data. This allows the history data to include pieces of information regarding job data transmitted from a plurality of information processing apparatuses, for example. This also allows the image information data to include printing results of the plurality of information processing apparatuses, for example. Accordingly, it is further easier to find the favorite data to be used.

[Modification 1]

According to the example embodiment described above, the image information data IA and the history data HA may be stored in the storage section 420 of the cloud storage 400; however, this is non-limiting. Alternatively, the image information data IA and the history data HA may be stored in a storage section of an information processing apparatus. In the following, an image processing system 1A according to Modification 1 is described in detail.

Figure 13:
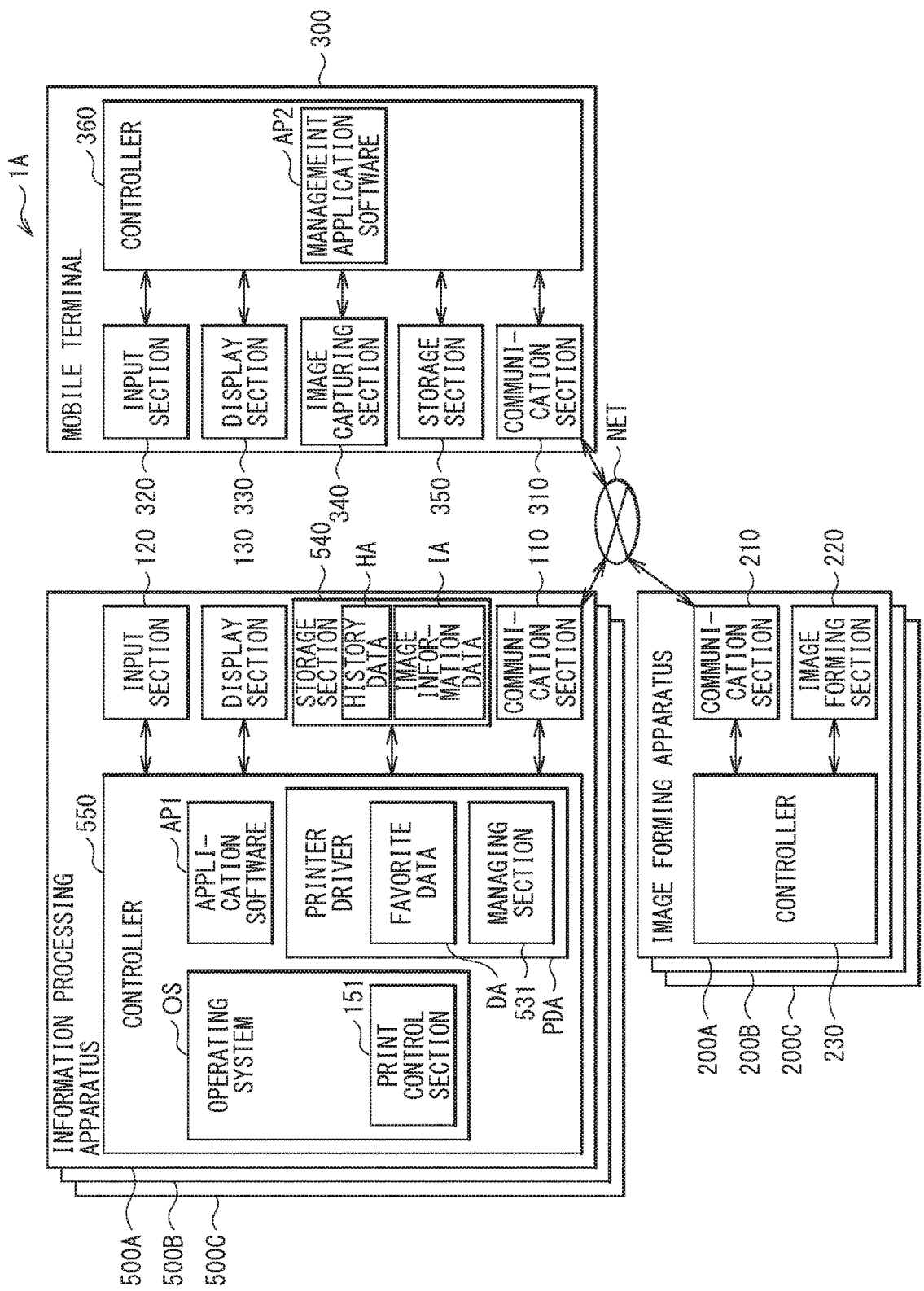
FIG. 13 is a block diagram illustrating an example of a configuration of an image processing system according to a modification.

FIG. 13 illustrates an example of a configuration of the image processing system 1A. The image processing system 1A may include a plurality of information processing apparatuses 500, the plurality of image forming apparatuses 200, and the mobile terminal 300. In this example, the image processing system 1A may include three information processing apparatuses 500A, 500B, and 500C as the information processing apparatuses 500. Hereinafter, each of the information processing apparatuses 500A, 500B, and 500C is sometimes simply referred to as the "information processing apparatus 500". A description below related to the information processing apparatus 500 may be similarly applicable to any of the information processing apparatuses 500A, 500B, and 500C. The information processing apparatus 500 may include a storage section 540 and a controller 550. The storage section 540 may hold the image information data IA and the history data HA. The controller 550 may be configured to execute a printer driver PDA. The printer driver PDA may be configured to generate the print data. The printer driver PDA may include a managing section 531. The managing section 531 may be configured to manage the history data HA and the image information data IA stored in the storage section 540.

Figure 14:
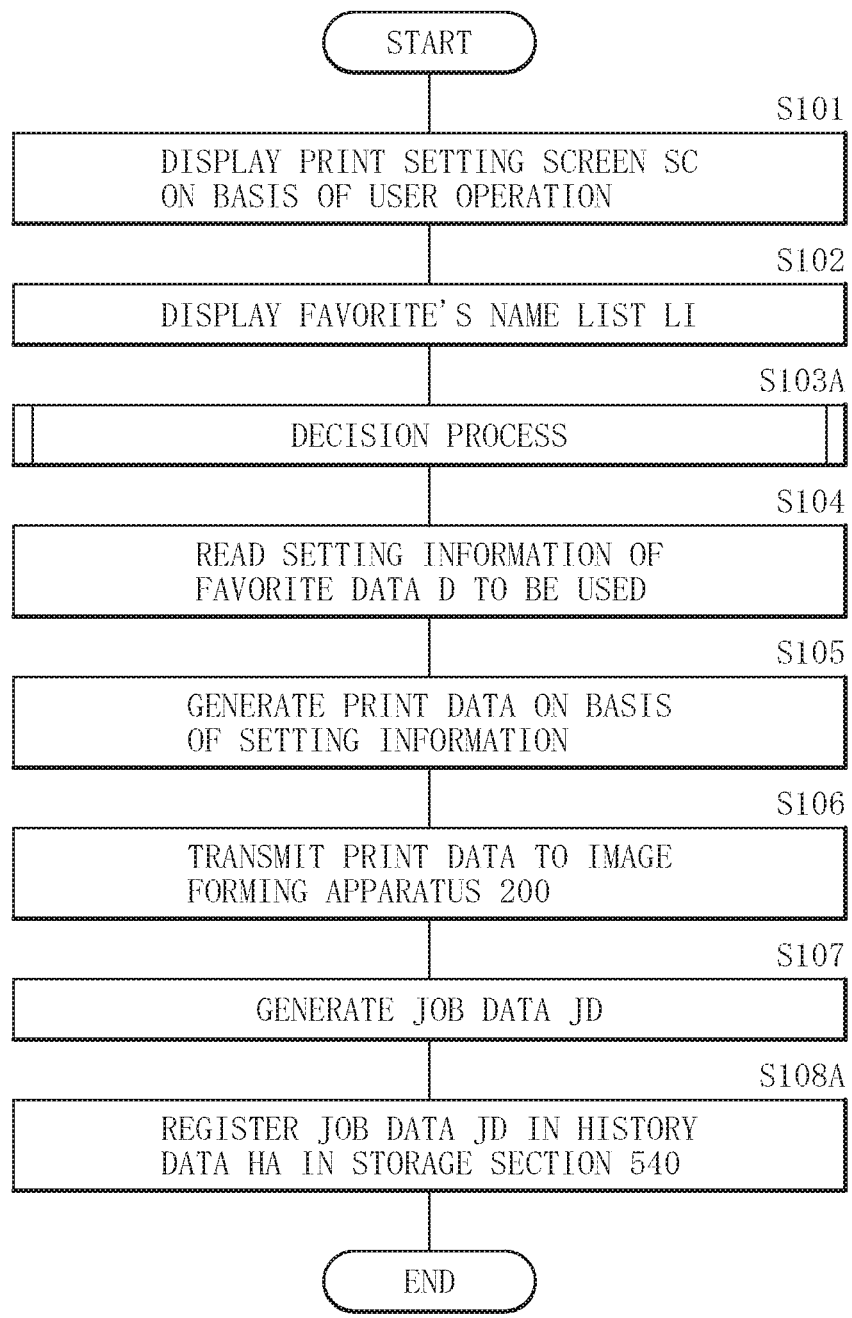
FIG. 14 is a flowchart illustrating an example of a process to be performed by an information processing apparatus illustrated in FIG. 13.

FIG. 14 illustrates an example of operation of a printing process to be performed by the information processing apparatus 500. Processes in steps S101, S102, and S104 to S107 may be similar to those according to the example embodiment illustrated in FIG. 5.

First, the display section 130 may display, on the basis of the user operation performed on the printing screen, the print setting screen SC adapted to configure the print setting (step S101). Thereafter, the display section 130 may display the favorite's name list LI on the basis of the user operation (step S102). Thereafter, the printer driver PDA may perform a decision process of deciding the favorite data D to be used (step S103A).

Figure 15:
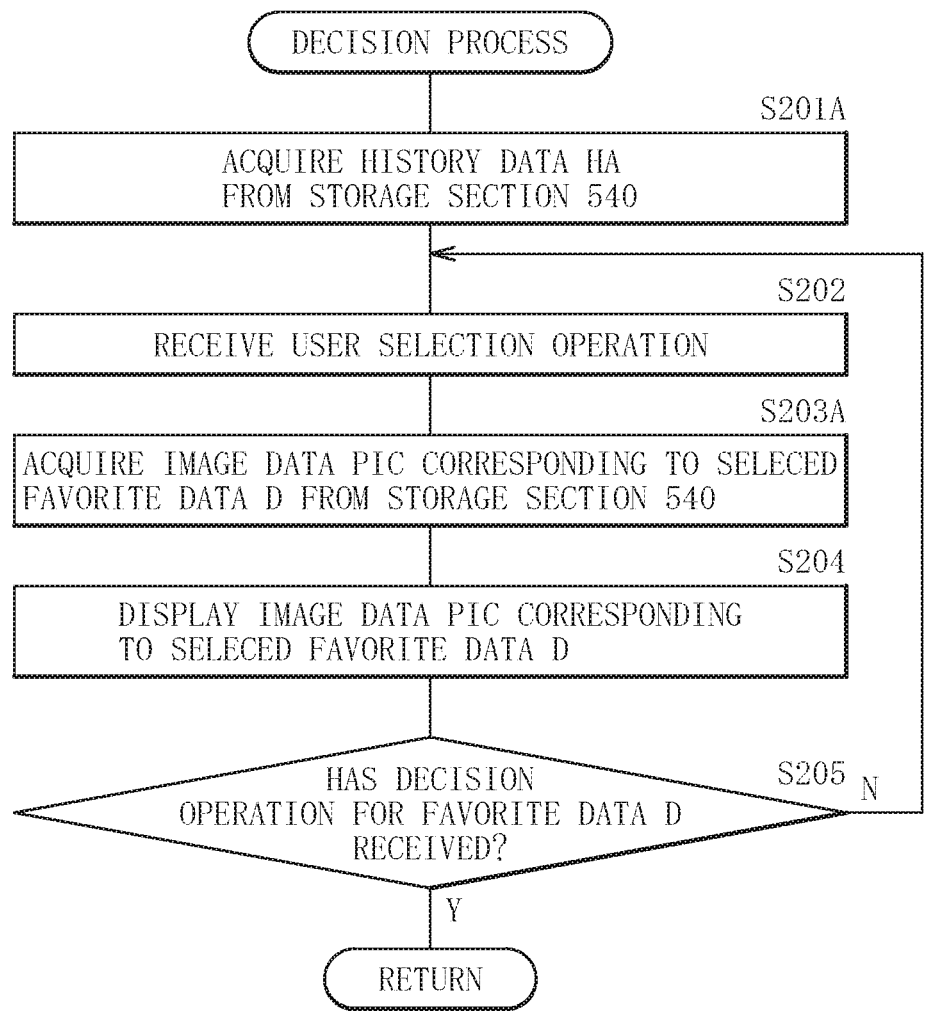
FIG. 15 is another flowchart illustrating an example of the process to be performed by the information processing apparatus illustrated in FIG. 13.

FIG. 15 illustrates an example of operation of the decision process in step S103A. Processes in steps S202, S204, and S205 may be similar to those according to the example embodiment illustrated in FIG. 7.

First, the printer driver PDA may acquire the history data HA from the storage section 540 (step S201A). Thereafter, the input section 120 may receive the user selection operation performed on the favorite's name list LI (step S202). Thereafter, the printer driver PDA may acquire, on the basis of the selection operation for the favorite data D performed by the user and the history data HA, the image data PIC corresponding to the selected favorite data D from the storage section 540 (step S203A). Thereafter, the display section 130 may display, on the basis of an instruction given by the printer driver PDA, the image data PIC corresponding to the selected favorite data D (step S204). Thereafter, the printer driver PDA may determine whether the input section 120 has received the decision operation for the favorite data D (step S205). In a case where the input section 120 has received the decision operation for the favorite data D ("Y" in step S205), the process may be brought to an end. In a case where the input section 120 has not received the decision operation for the favorite data D ("N" in step S205), the process may be caused to return to step S202. This may be the end of the flow.

Thereafter, as illustrated in FIG. 14, the printer driver PDA may read, on the basis of a result of the decision for the favorite data D, the setting information of the favorite data D to be used (step S104). Thereafter, the printer driver PDA may generate the print data on the basis of the setting information of the favorite data D to be used (step S105). Thereafter, the communication section 110 may transmit the print data to the image forming apparatus 200 on the basis of an instruction given by the printer driver PDA (step S106). Thereafter, the printer driver PDA may generate the job data JD (step S107). Thereafter, the managing section 531 may register the job data JD in the history data HA in the storage section 540 (step S108A). In one specific but non-limiting example, the managing section 531 may provide a history identifier to the job data JD, and register the job data JD and the history identifier in the history data HA in the storage section 540 as the history data H. This may be the end of the flow.

Figure 16:
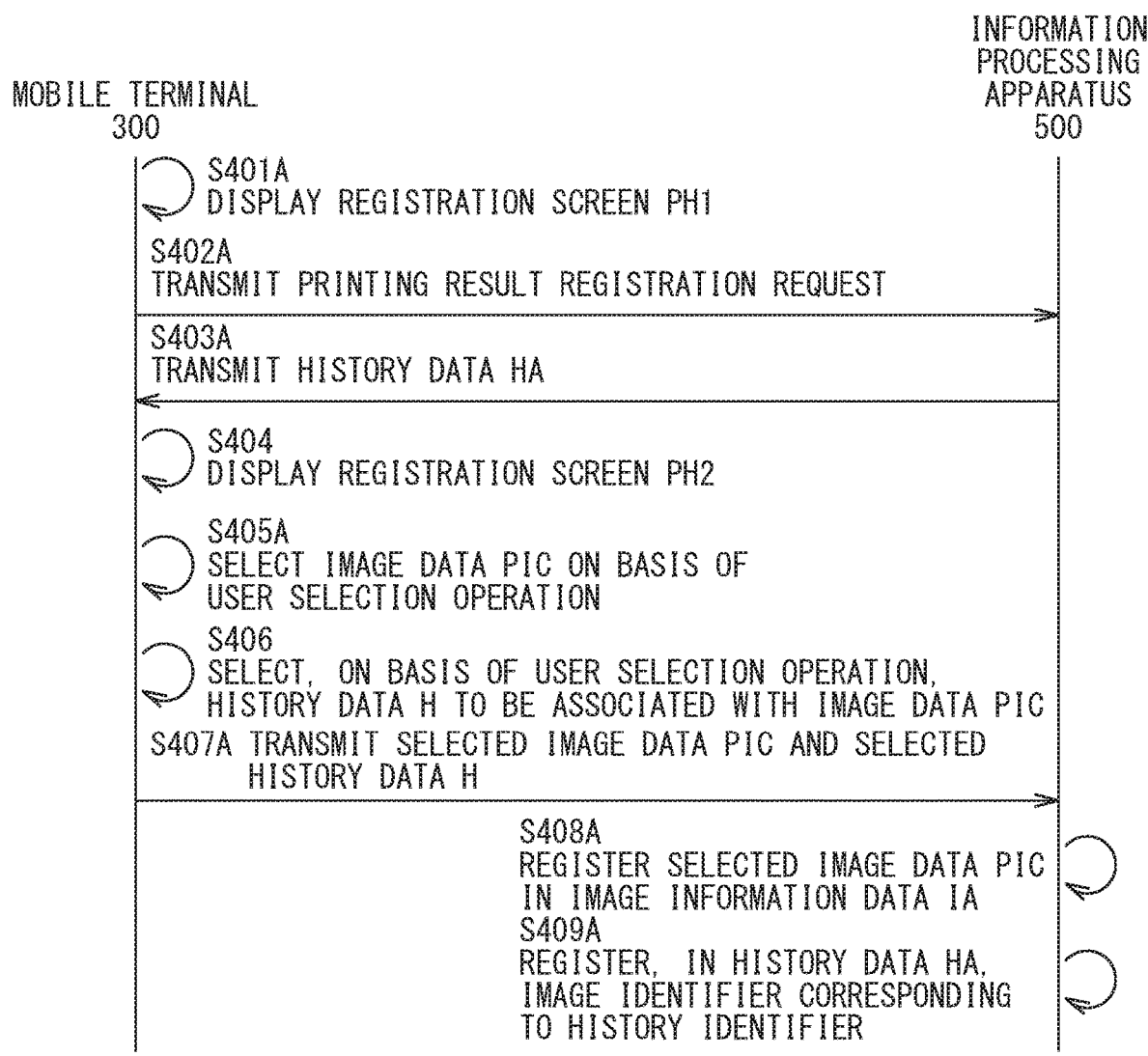
FIG. 16 is a sequence diagram illustrating an example of a process to be performed by the information processing apparatus and the mobile terminal illustrated in FIG. 13.

FIG. 16 illustrates an example of operation of a registration process to be performed by the information processing apparatus 500 and the mobile terminal 300. Processes in steps S404 to S406 may be similar to those according to the example embodiment illustrated in FIG. 10.

First, the mobile terminal 300 may display the registration screen PH1 on the basis of the user operation (step S401A). The registration screen PH1 may be adapted to make a printing result registration request to the information processing apparatus 500. Thereafter, the mobile terminal 300 may transmit the printing result registration request to the information processing apparatus 500 on the basis of the user operation (step S402A). Thereafter, the information processing apparatus 500 may transmit the history data HA to the mobile terminal 300 on the basis of the printing result registration request (step S403A). Thereafter, the mobile terminal 300 may display the registration screen PH2 on the basis of the history data HA (step S404). Thereafter, the mobile terminal 300 may select, on the basis of the user selection operation, the image data PIC which the mobile terminal 300 is to transmit to the information processing apparatus 500 (step S405A). Thereafter, the mobile terminal 300 may select, on the basis of the user operation, the history data H to be associated with the image data PIC (step S406). Thereafter, the mobile terminal 300 may transmit the selected history data H and the selected image data PIC to the information processing apparatus 500 (step S407A). Thereafter, the information processing apparatus 500 may register the selected image data PIC in the image information data IA (step S408A). Thereafter, the information processing apparatus 500 may register, in the history data H, the image identifier corresponding to the history identifier (step S409A). This may be an end of the flow.

As described above, in the image processing system 1A, the information processing apparatus 500 may hold the history data HA and the image information data IA. This may allow the image data PIC corresponding to the selected favorite data D to be acquired without the use of the communication section 110. As a result, the image data PIC is allowed to be displayed without any trouble even when the network NET is in an unstable connection state. As a result, it is possible to improve user friendliness.

[Modification 2]

According to the example embodiment described above, the image formed on the recording medium by the image forming apparatus 200 may be captured and the image data PIC may be thereby formed; however, this is non-limiting. The data to be generated may be any image data representing the printing result. For example, upon generating the print data, the information processing apparatus may generate data representing an image that is visually-recognizable by the user and is to be formed on the recording medium. In the following, an image processing system 1B according to Modification 2 is described in detail.

Figure 17:
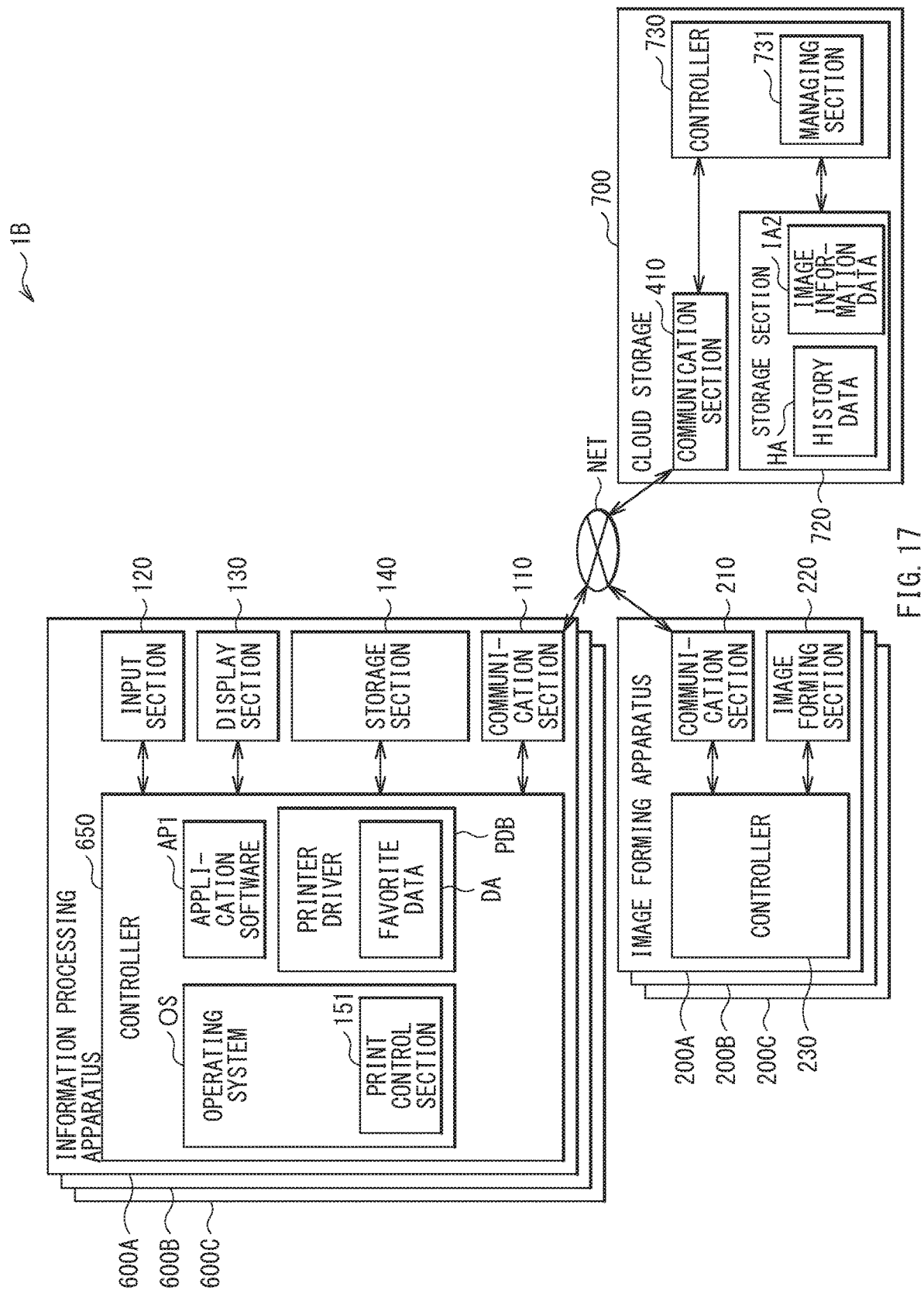
FIG. 17 is a block diagram illustrating an example of a configuration of an image processing system according to another modification.

FIG. 17 illustrates an example of a configuration of the image processing system 1B. The image processing system 1B may include a plurality of information processing apparatuses 600, the plurality of image forming apparatuses 200, and cloud storage 700. In this example, the image processing system 1B may include three information processing apparatuses 600A, 600B, and 600C as the information processing apparatuses 600. Hereinafter, each of the information processing apparatuses 600A, 600B, and 600C is sometimes simply referred to as the "information processing apparatus 600". A description below related to the information processing apparatus 600 may be similarly applicable to any of the information processing apparatuses 600A, 600B, and 600C.

The information processing apparatus 600 may include a controller 650. The controller 650 may be configured to execute a printer driver PDB. The printer driver PDB may be configured to generate the print data. The printer driver PDB may be also configured to perform operation including, without limitation, operation of transmitting the job data JD and image data PIC2 to the cloud storage 700 and operation of acquiring the image data PIC2 from the cloud storage 700.

The cloud storage 700 may include a storage section 720 and a controller 730. The storage section 720 may hold image information data IA2. The image information data IA2 may be a database in which image information data I, which is information regarding the image data PIC2, is to be registered. The controller 730 may include a managing section 731. The managing section 731 may be configured to manage the history data HA and the image information data IA2 that are stored in the storage section 720.

Figure 18:
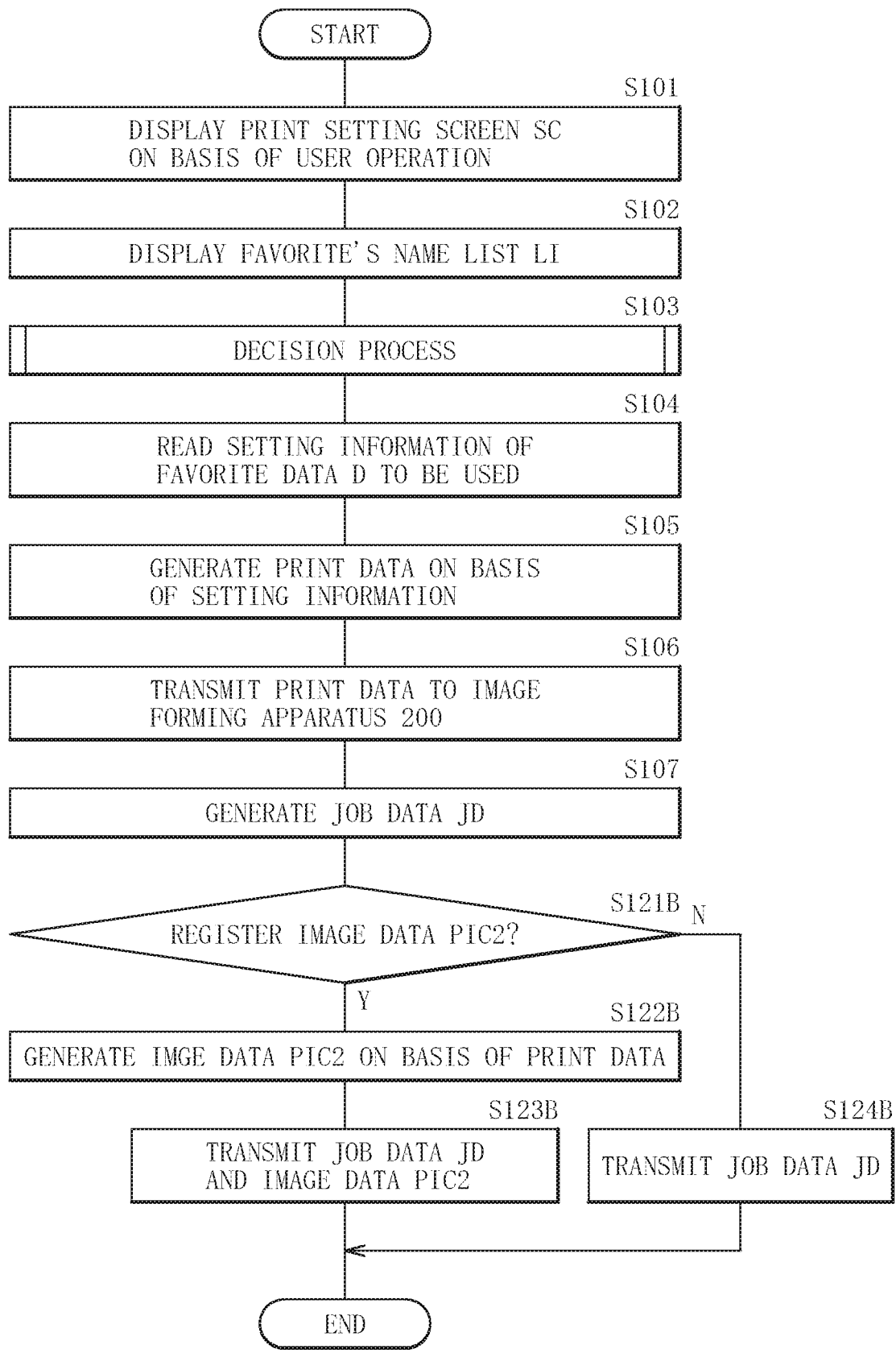
FIG. 18 is a flowchart illustrating an example of a process to be performed by an information processing apparatus illustrated in FIG. 17.

FIG. 18 illustrates an example of operation of a printing process and a registration process that are to be performed by the information processing apparatus 600. Processes in steps S101 to S107 may be similar to those according to the example embodiment illustrated in FIG. 5.

In step S107, after the information processing apparatus 600 generates the job data JD, the printer driver PDB may determine, on the basis of the user operation, whether the cloud storage 700 registers the image data PIC2. In a case where the cloud storage 700 does not register the image data PIC2 ("N" in step S121B), the communication section 110 may transmit the job data JD to the cloud storage 700 on the basis of an instruction given by the printer driver PDB (step S124B). Thereafter, the process may be brought to an end.

In a case where the cloud storage 700 registers the image data PIC2 ("Y" in step S121B), the printer driver PDB may generate the image data PIC2 on the basis of the print data (step S122B). In one specific but non-limiting example, the printer driver PDB may generate, as the image data PIC2, data visually representing an image that is to be formed by the image forming apparatus 200 on the recording medium on the basis of the print data. Non-limiting examples of such data visually representing the image that is to be formed by the image forming apparatus 200 may include print preview data.

Thereafter, the communication section 110 may transmit, on the basis of an instruction given by the printer driver PDB, the job data JD and the image data PIC2 to the cloud storage 700 (step S123B). This may be an end of the flow.

Figure 19:
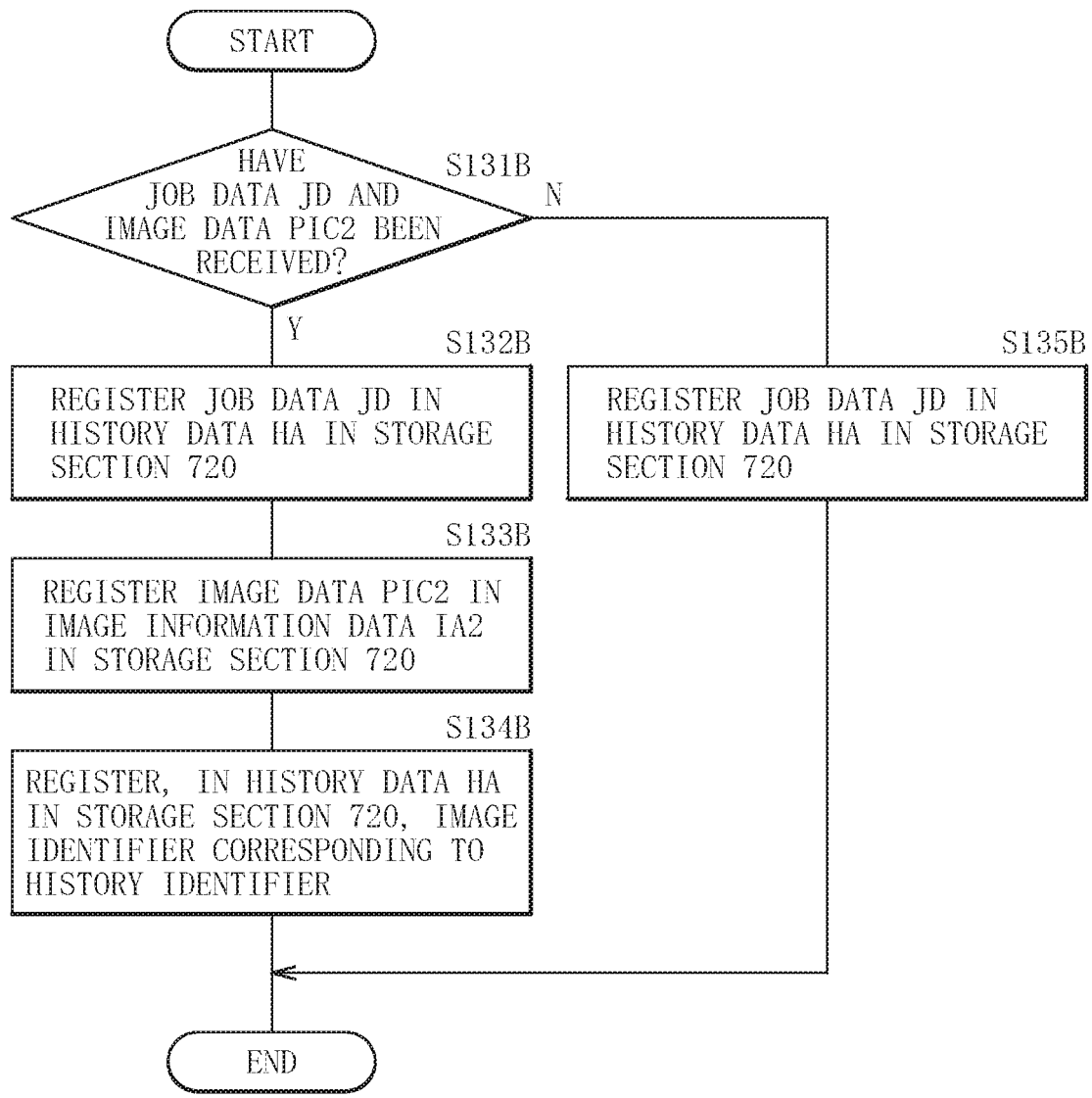
FIG. 19 is a flowchart illustrating an example of a process to be performed by cloud storage illustrated in FIG. 17.

FIG. 19 illustrates an example of operation of a process to be performed by the cloud storage 700. In the following, a description is given of a process to be performed in a case where the cloud storage 700 has received the job data JD and the image data PIC2 in step S123B or in a case where the cloud storage 700 has received the job data JD in step S124B.

First, the controller 730 may determine whether the communication section 410 has received the job data JD and the image data PIC2 transmitted by the information processing apparatus 600 (step S131B). In a case where the communication section 410 has not received the job data JD and the image data PIC2 ("N" in step S131B), the managing section 731 may register the job data JD in the history data HA in the storage section 720 (step S135B). In one specific but non-limiting example, the managing section 731 may provide a history identifier to the job data JD received by the communication section 410, and register the job data JD and the history identifier in the history data HA as the history data H. Thereafter, the process may be brought to an end.

In a case where the communication section 410 has received the job data JD and the image data PIC2 ("Y" in step S131B), the managing section 731 may register the job data JD in the history data HA in the storage section 720 (step S132B). In one specific but non-limiting example, the managing section 731 may provide a history identifier to the job data JD received by the communication section 410, and register the job data JD and the history identifier in the history data HA as the history data H.

Thereafter, the managing section 731 may register the image data PIC2 in the image information data IA2 in the storage section 720 (step S133B). In one specific but non-limiting example, the managing section 731 may provide an image identifier to the image data PIC2 received by the communication section 410. The managing section 731 may generate the image information data I on the basis of the image identifier, the image data PIC2, and the history identifier which the managing section 731 has provided in step S132B. Further, the managing section 731 may register the generated image information data I in the image information data IA2. Upon registering the image information data I, the managing section 731 may further register a date and time at this timing as the date and time of registration of the image information data I.

Thereafter, the cloud storage 700 may register, in the history data HA in the storage section 720, the image identifier corresponding to the history identifier (step S134B). In one specific but non-limiting example, the managing section 731 may search for the history data H including the history identifier which the managing section 731 has provided in step S132B among the plurality of pieces of history data H in the history data HA. Further, the managing section 731 may register the image identifier, which the managing section 731 has provided in step S133B, as the image identifier of the searched history data H in the history data HA. This may be an end of the flow.

As described above, in the image processing system 1B, the information processing apparatus 600 may generate the image data PIC2 on the basis of the print data after the printing process. This allows the image data PIC2 to be registered in the cloud storage 700 with less operation steps. As a result, it is possible to improve user friendliness.

[Modification 3]

According to the example embodiment described above, the information processing apparatus 100 may display the favorite's name corresponding to the selected favorite data D and the image data PIC corresponding to the selected favorite data D; however, this is non-limiting. Alternatively, for example: a plurality of favorite's names corresponding to the respective pieces of favorite data D; and a plurality of pieces of image data PIC corresponding to the respective pieces of favorite data D may be displayed together. In the following, Modification 3 is described in detail.

Figure 20:
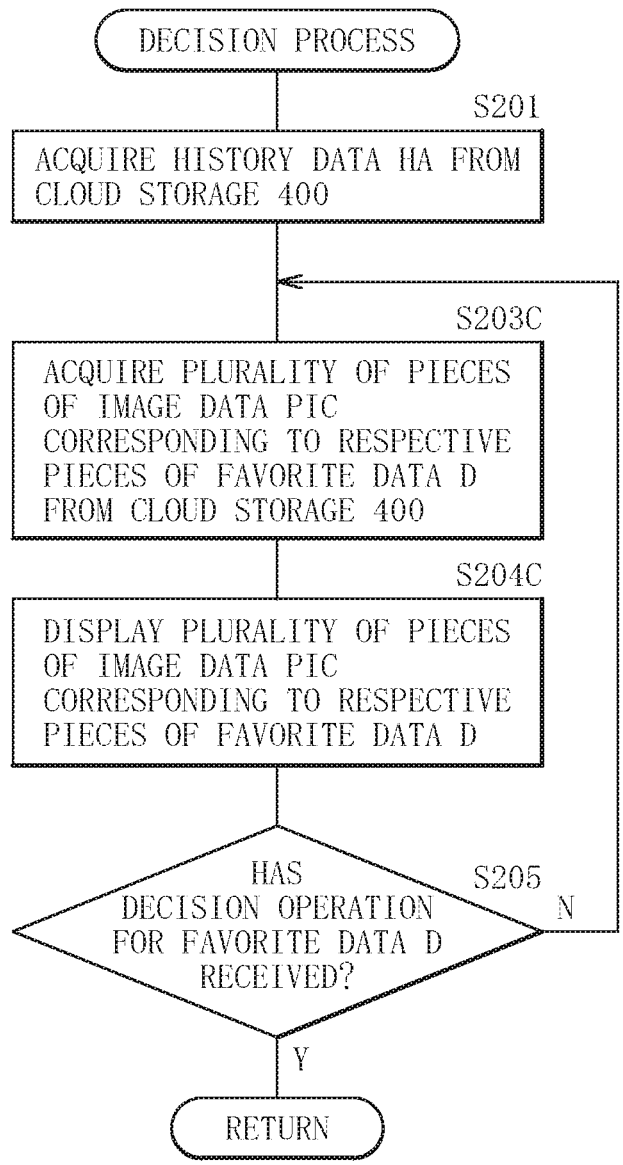
FIG. 20 is a flowchart illustrating an example of a process to be performed by an information processing apparatus according to still another modification.

FIG. 20 illustrates an example of operation of a decision process to be performed by a printer driver PDC according to Modification 3. In the following, this decision process is described in detail.

First, the printer driver PDC may acquire the history data HA from the cloud storage 400 (step S201).

Thereafter, the printer driver PDC may acquire, on the basis of the history data HA, a plurality of pieces of image data PIC corresponding to the respective pieces of favorite data D (step S203C). In one specific but non-limiting example, the printer driver PDC may identify a plurality of pieces of history data H that each include any of the favorite's names of the respective pieces of favorite data D included in the favorite data DA, and acquire the image identifiers included in the respective pieces of identified history data H. The printer driver PDC may search for a plurality of pieces of image information data I including the respective acquired image identifiers in the image information data IA in the cloud storage 400, and acquire a plurality of pieces of image data PIC of the respective pieces of searched image information data I.

Thereafter, the display section 130 may display, on the basis of an instruction given by the printer driver PDC, the plurality of pieces of image data PIC corresponding to the respective pieces of favorite data D (step S204C). In one specific but non-limiting example, the printer driver PDC may instruct the display section 130 to display: the favorite's names corresponding to the respective pieces of favorite data D included in the favorite data DA; and the plurality of pieces of image data PIC corresponding to the respective pieces of favorite data D together. Further, the display section 130 may display, on the basis of the instruction given by the printer driver PDC, the plurality of pieces of image data PIC corresponding to the respective pieces of favorite data D.

Figure 21:
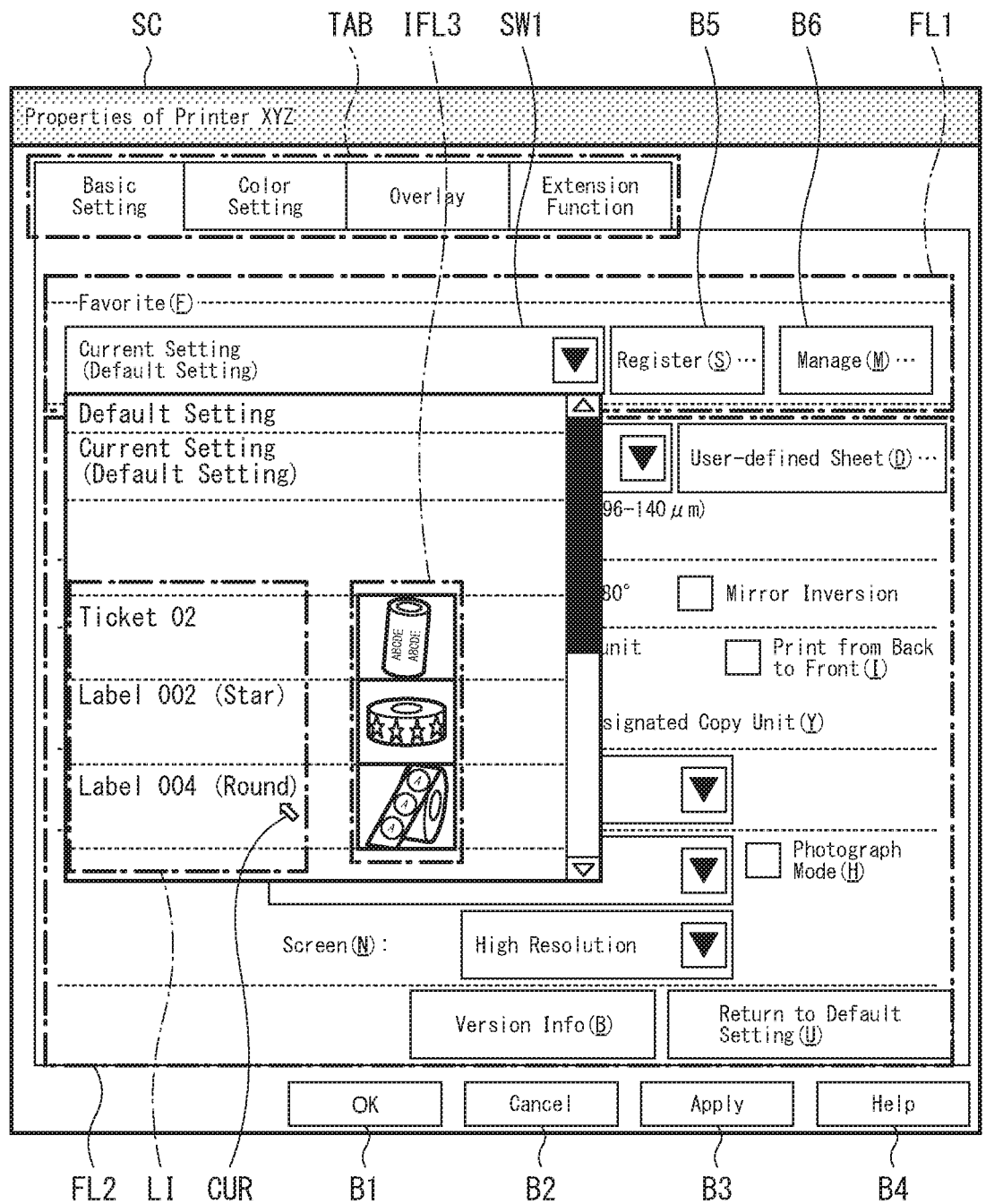
FIG. 21 is an image diagram illustrating an example of the display screen to be used in a process illustrated in FIG. 20.

FIG. 21 illustrates an example of the print setting screen SC in step S204C. The print setting screen SC may include the favorite's name list LI and an image field IFL3. In this example, the favorite's name list LI may include "Ticket 02", "Label 002 (Star)", and "Label 004 (Round)". The image field IFL3 may be a field adapted to display the plurality of pieces of image data PIC corresponding to the respective pieces of favorite data D included in the favorite data DA. The printer driver PDC may acquire each of the image identifiers of the plurality of pieces of history data H corresponding to the respective pieces of favorite data D having the favorite's names "Ticket 02", "Label 002 (Star)", and "Label 004 (Round)". The printer driver PDC may thereby acquire each of the image data PIC having the image identifier "IMG052", the image data PIC having the image identifier "IMG051", and the image data PIC having the image identifier "IMG053". Further, the display section 130 may display the three pieces of acquired image data PIC in the image field IFL3 in correspondence with the respective favorite's names.

Thereafter, the printer driver PDC may determine whether the input section 120 has received the decision operation for the favorite data D (step S205). In a case where the input section 120 has received the decision operation for the favorite data D ("Y" in step S205), the process may be brought to an end. In a case where the input section 120 has not received the decision operation for the favorite data D ("N" in step S205), the process may be caused to return to step S203C. This may be the end of the flow.

In this example, the plurality of pieces of favorite data D and the plurality of pieces of image data PIC associated with the respective pieces of favorite data D may be displayed in correspondence with each other on the print setting screen SC. This allows the user to efficiently recognize the printing results obtained with the use of the respective pieces of favorite data D. Accordingly, it is further easier for the user to find the favorite data D to be used. As a result, it is possible to improve user friendliness.

[Modification 4]

According to the example embodiment described above, the information processing apparatus 100 may display the favorite's name corresponding to the selected favorite data D and the image data PIC corresponding to the selected favorite data D; however, this is non-limiting. Alternatively, for example, a plurality of pieces of image data PIC corresponding to the selected favorite data D may be displayed. In the following, Modification 4 is described in detail.

Figure 22:
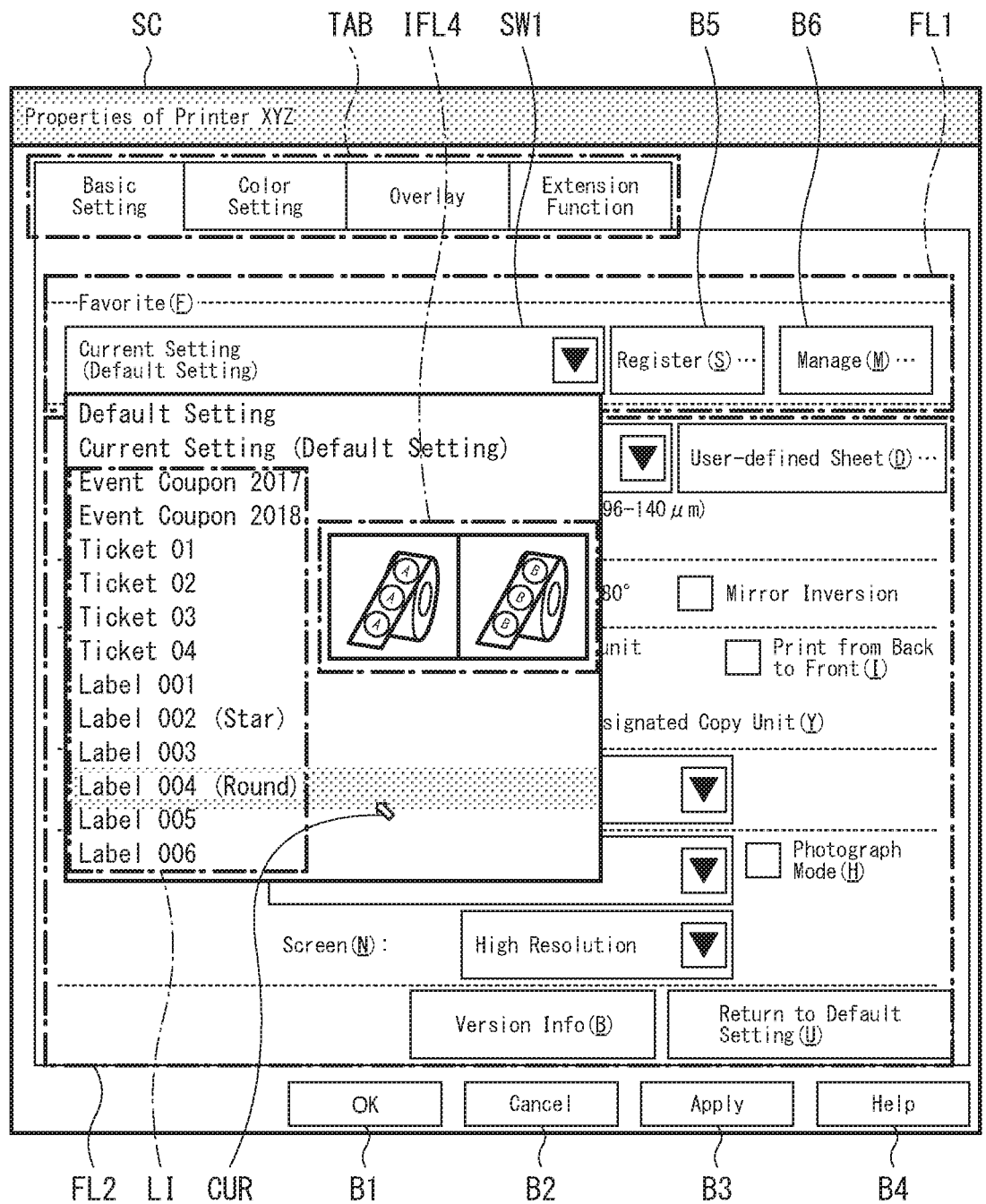
FIG. 22 is an image diagram illustrating an example of the display screen to be used in a process to be performed by an image processing system according to still another modification.

FIG. 22 illustrates an example of the print setting screen SC according to Modification 4. The print setting screen SC may include an image field IFL4. The image field IFL4 may be adapted to display a plurality of pieces of image data PIC corresponding to the selected favorite data D. In this example, the display section 130 may display, in the image field IFL4, two pieces of image data PIC corresponding to the favorite data D having the favorite's name "Label 004 (Round)".

In this example, the favorite data D and the plurality of pieces of image data PIC associated with the favorite data D may be displayed in correspondence with each other on the print setting screen SC. This allows the user to recognize a plurality of printing results obtained with the use of the selected favorite data D. Accordingly, it is further easier for the user to find the favorite data D to be used. As a result, it is possible to improve user friendliness.

[Other Modifications]

Moreover, any combination of two or more of Modifications 1 to 4 may be adopted.

Although the technology has been described referring to the example embodiments and the modifications thereof, the technology is not limited thereto, and various modifications may be made.

In the example embodiment described above, the cloud storage 400 may include a server; however, this is non-limiting. Alternatively, cloud storage may include network attached storage (NAS), for example.

Furthermore, the technology encompasses any possible combination of some or all of the various embodiments and the modifications described herein and incorporated herein. It is possible to achieve at least the following configurations from the above-described example embodiments of the technology.

(1)
A preset information displaying method including:
performing a first registration process, the first registration process being a process of registering, in a database, first preset information and first image information in a state of being associated with each other, the first preset information being used upon performing a first printing process, the first image information representing a result of the first printing process; and performing a display process, the display process being a process of displaying, on a selection screen, the first preset information and the first image information in correspondence with each other, the first image information being associated with the first preset information in the database, the selection screen including a list of one or a plurality of pieces of preset information including the first preset information, the selection screen receiving selection operation, the selection operation being operation of selecting any of the one or the plurality of pieces of preset information.

(2)
The preset information displaying method according to (1), further including
performing a first input process, the first input process being a process of receiving the selection operation on the selection screen, in which
the first preset information includes the preset information that is selected through the selection operation.

(3)
The preset information displaying method according to (1), further including
performing a second registration process, the second registration process being a process of registering, in the database, second preset information and second image information in a state of being associated with each other, the second preset information being used upon performing a second printing process, the second image information representing a result of the second printing process, in which
the one or the plurality of pieces of preset information includes the second preset information,
the display process includes a process of displaying, on the selection screen, the second preset information and the second image information in correspondence with each other, the second image information being associated with the second preset information in the database.

(4)
The preset information displaying method according to (1), further including
performing a third registration process, the third registration process being a process of registering, in the database, the first preset information used upon performing a third printing process and third image information in a state of being associated with each other, the third image information representing a result of the third printing process, in which
the display process further includes a process of displaying, on the selection screen, the first preset information and the third image information in correspondence with each other, the third image information being associated with the first preset information in the database.

(5)
The preset information displaying method according to any one of (1) to (4), in which the first image information includes image information obtained by capturing an image of the result of the first printing process.

(6)
The preset information displaying method according to any one of (1) to (4), further including performing an image generation process upon performing the first printing process, the image generation process being a process of generating the first image information.

(7)

The preset information displaying method according to any one of (1) to (6), in which the display process is performed by an information processing apparatus, and the database is stored in a storage apparatus.

(8)

The preset information displaying method according to any one of (1) to (6), in which the display process is performed by an information processing apparatus, and the database is stored in the information processing apparatus.

(9)

The preset information displaying method according to any one of (1) to (8), further including:

performing a second input process, the second input process being a process of receiving decision operation on the selection screen, the decision operation being operation of deciding the first preset information; and performing a print data generation process, the print data generation process being a process of generating print data on the basis of the first preset information decided through the decision operation.

(10)

An information processing apparatus including a display processor that causes first preset information and first image information to be displayed on a selection screen in correspondence with each other, the first preset information being used upon performing a first printing process, the first image information representing a result of the first printing process, the selection screen including a list of one or a plurality of pieces of preset information including the first preset information, the selection screen receiving selection operation, the selection operation being operation of selecting any of the one or the plurality of pieces of preset information, in which the first preset information is registered, in a database, in a state of being associated with the first image information, and the display processor causes the first preset information and the first image information to be displayed in correspondence with each other, the first image information being associated with the first preset information in the database.

According to the preset information displaying method and the information processing apparatus each according to one embodiment of the technology, the first preset information used upon performing the first printing process and the first image information representing the result of the first printing process are displayed, on the selection screen, in correspondence with each other. The selection screen receives the selection operation of selecting any of the one or the plurality of pieces of preset information. As a result, it is possible to improve user friendliness.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A preset information displaying method comprising:

performing a first registration process, the first registration process being a process of registering, in a database, first preset information and first image information in a state of being associated with each other, the first preset information being used upon performing a first printing process that includes a process of forming an image on a recording medium, the first image information representing a result of the first printing process to thereby include image information that is based on image capturing of, together with the recording medium and as a whole, the image formed on the recording medium; and performing a display process, the display process being a process of displaying, on a selection screen, the first preset information and the first image information in correspondence with each other, the first image information being associated with the first preset information in the database, the selection screen including a list of one or a plurality of pieces of preset information including the first preset information, the selection screen receiving selection operation, the selection operation being operation of selecting any of the one or the plurality of pieces of preset information.

2. The preset information displaying method according to claim 1, further comprising performing a first input process, the first input process being a process of receiving the selection operation on the selection screen, wherein the first preset information comprises the preset information that is selected through the selection operation.

3. The preset information displaying method according to claim 1, further comprising performing a second registration process, the second registration process being a process of registering, in the database, second preset information and second image information in a state of being associated with each other, the second preset information being used upon performing a second printing process, the second image information representing a result of the second printing process, wherein the one or the plurality of pieces of preset information includes the second preset information, the display process includes a process of displaying, on the selection screen, the second preset information and the second image information in correspondence with each other, the second image information being associated with the second preset information in the database.

4. The preset information displaying method according to claim 1, further comprising performing a third registration process, the third registration process being a process of registering, in the database, the first preset information used upon performing a third printing process and third image information in a state of being associated with each other, the third image information representing a result of the third printing process, wherein the display process further includes a process of displaying, on the selection screen, the first preset information and the third image information in correspondence with each other, the third image information being associated with the first preset information in the database.

5. The preset information displaying method according to claim 1, wherein the display process is performed by an information processing apparatus, and the database is stored in a storage apparatus.

6. The preset information displaying method according to claim 1, wherein the display process is performed by an information processing apparatus, and the database is stored in the information processing apparatus.

7. The preset information displaying method according to claim 1, further comprising:

performing a second input process, the second input process being a process of receiving decision operation on the selection screen, the decision operation being operation of deciding the first preset information; and performing a print data generation process, the print data generation process being a process of generating print data on a basis of the first preset information decided through the decision operation.

8. An information processing apparatus comprising a display processor that causes first preset information and first image information to be displayed on a selection screen in correspondence with each other, the first preset information being used upon performing a first printing process that includes a process of forming an image on a recording medium, the first image information representing a result of the first printing process to thereby include image information that is based on image capturing of, together with the recording medium and as a whole, the image formed on the recording medium, the selection screen including a list of one or a plurality of pieces of preset information including the first preset information, the selection screen receiving selection operation, the selection operation being operation of selecting any of the one or the plurality of pieces of preset information, wherein the first preset information is registered, in a database, in a state of being associated with the first image information, and the display processor causes the first preset information and the first image information to be displayed in correspondence with each other, the first image information being associated with the first preset information in the database.

* * * * *